United States Patent
Terada et al.

(10) Patent No.: US 9,836,312 B2
(45) Date of Patent: Dec. 5, 2017

(54) STORAGE CONTROL DEVICE, STORAGE DEVICE, AND STORAGE CONTROL METHOD THEREOF

(71) Applicant: Sony Corporation, Tokyo (JP)

(72) Inventors: Haruhiko Terada, Tokyo (JP); Keiichi Tsutsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 323 days.

(21) Appl. No.: 14/310,205

(22) Filed: Jun. 20, 2014

(65) Prior Publication Data

US 2015/0006836 A1    Jan. 1, 2015

(30) Foreign Application Priority Data

Jun. 27, 2013  (JP) ................................ 2013-134509

(51) Int. Cl.
G06F 9/44     (2006.01)
G06F 3/06     (2006.01)
G06F 11/14    (2006.01)

(52) U.S. Cl.
CPC .......... *G06F 9/4418* (2013.01); *G06F 3/0689* (2013.01); *G06F 11/1446* (2013.01)

(58) Field of Classification Search
CPC ... G06F 3/0689; G06F 11/1446; G06F 9/4418
USPC ........................................................ 711/162
See application file for complete search history.

(56) References Cited

U.S. PATENT DOCUMENTS

| 2004/0186945 A1* | 9/2004 | Jeter, Jr. ............... | G06F 11/2087 711/5 |
| 2006/0015683 A1* | 1/2006 | Ashmore .............. | G06F 1/3203 711/113 |
| 2007/0033432 A1* | 2/2007 | Pecone .................. | G06F 1/305 714/6.12 |
| 2007/0033433 A1* | 2/2007 | Pecone .................. | G06F 1/305 714/6.13 |
| 2008/0294820 A1* | 11/2008 | Croxford ............ | G06F 13/4013 710/105 |
| 2009/0147882 A1* | 6/2009 | Rha ..................... | H04L 25/4915 375/295 |
| 2010/0205367 A1* | 8/2010 | Ehrlich ............... | G06F 12/0804 711/113 |

FOREIGN PATENT DOCUMENTS

JP         2011-186558        9/2011

* cited by examiner

*Primary Examiner* — Prasith Thammavong
(74) *Attorney, Agent, or Firm* — Michael Best & Friedrich LLP

(57) ABSTRACT

A storage control device includes: a detection unit that determines whether a preliminary process of saving data from a first memory to a second memory is necessary, where the second memory includes a suspend area and a typical area; a preliminary processing unit that writes a first value to the suspend area when the detection unit has determined that the preliminary process is necessary; and a saving processing unit that writes a second value corresponding to the data. The first value is different from the second value when the detection unit has determined that the preliminary process is necessary.

20 Claims, 31 Drawing Sheets

0: WITHOUT WAITING FOR PRELIMINARY PROCESS
1: NECESSARY FOR WAITING FOR PRELIMINARY PROCESS

FIG. 18

| ADDRESS RANGE OF CORRESPONDING MAIN MEMORY | DIRTY FLAG | PRELIMINARY PROCESS FLAG |
|---|---|---|
| 0x0000 TO 0x000F | 0 | 0 |
| 0x0010 TO 0x001F | 1 | 0 |
| 0x0020 TO 0x002F | 1 | 1 |
| ⋮ | ⋮ | ⋮ |
| 0xFFE0 TO 0xFFEF | 0 | 0 |
| 0xFFF0 TO 0xFFFF | 1 | 1 |

FIG. 27    213

| MAIN MEMORY ADDRESS | ALLOCATION DESTINATION | VIRTUAL ADDRESS FOR EACH APPLICATION |
|---|---|---|
| 0x0000 | APPLICATION A | 0x000 |
| 0x0001 | APPLICATION A | 0x001 |
| ⋮ | ⋮ | ⋮ |
| 0x0FFF | APPLICATION A | 0xFFF |
| 0x1000 | EMPTY | – |
| 0x1001 | EMPTY | – |
| ⋮ | ⋮ | ⋮ |
| 0x1F00 | EMPTY | – |
| 0x1F01 | APPLICATION B | 0x000 |
| 0x1F02 | APPLICATION B | 0x001 |
| ⋮ | ⋮ | ⋮ |

0: UPDATING AFTER IMMEDIATELY PREVIOUS RESTORATION PROCESS IS NOT CARRIED OUT
1: UPDATING AFTER IMMEDIATELY PREVIOUS RESTORATION PROCESS IS CARRIED OUT

US 9,836,312 B2

STORAGE CONTROL DEVICE, STORAGE DEVICE, AND STORAGE CONTROL METHOD THEREOF

CROSS REFERENCE TO RELATED APPLICATIONS

This application claims the benefit of Japanese Priority Patent Application JP 2013-134509 filed Jun. 27, 2013, the entire contents of which are incorporated herein by reference.

BACKGROUND

The present disclosure relates to a storage control device, and more particularly, to a storage control device that controls a saving process between memories, a storage device, a storage control method thereof, and a program that allows a computer to execute the method.

In an information processing system including a nonvolatile storage memory in addition to a volatile main memory, the following suspension process and restoration process are used to cut off power of the information processing system while retaining data in operation. That is, as the suspension process, a host computer cuts off the power of the information processing system after saving all data in use on a main memory in an area that is secured in a storage memory. In addition, as the restoration process, the host computer restores the data that is saved in the storage memory to the main memory. In the related art, the data saving is carried out during shutdown. For example, a device, which includes flag data indicating whether or not data on a DRAM is synchronized with data on a flash memory, and which only transmits data necessary for synchronization to a flash memory on the basis of flag data during shutdown, is suggested (for example, refer to Japanese Unexamined Patent Application Publication No. 2011-186558).

SUMMARY

In the above-described related art, the data saving is carried out during system shutdown. However, in a case of carrying out all processes necessary for the data saving during shutdown, there is a problem in that a time necessary for the shutdown increases.

It is desirable to shorten a processing time when carrying out data saving between memories.

According to a first embodiment of the present disclosure, there are provided a storage control device and a storage control method thereof. The storage control device comprises: a detection unit configured to determine whether a preliminary process of saving data from a first memory to a second memory is necessary, wherein the second memory includes a suspend area and a typical area; a preliminary processing unit configured to write a first value to the suspend area when the detection unit has determined that the preliminary process is necessary; and a saving processing unit configured to write a second value corresponding to the data, wherein the first value is different from the second value when the detection unit has determined that the preliminary process is necessary. According to this, the preliminary process is carried out with respect to the data for which the necessity for saving is detected, and thus processes during the saving can be reduced.

In addition, according to a second embodiment of the present disclosure, there is provided a storage device including: a first memory configured to store data; a second memory configured to save the data stored in the first memory and including a suspend area and a typical area; a detection unit configured to determine whether a preliminary process of saving data from the first memory to the second memory is necessary; a preliminary processing unit configured to write a first value to the suspend area when the detection unit has determined that the preliminary process is necessary; and a saving processing unit configured to write a second value corresponding to the data, wherein the first value is different from the second value when the detection unit has determined that the preliminary process is necessary. According to this, an arbitrary preliminary process is carried out with respect to data for which necessity for saving from the first memory to the second memory is detected, and thus processes during the saving in the storage device can be reduced.

In addition, according to a third embodiment of the present disclosure, there is provided a storage control method comprising: determining, by a detection unit, whether a preliminary process of saving data from a first memory to a second memory is necessary, wherein the second memory includes a suspend area and a typical area; writing, by a preliminary processing unit, a first value to the suspend area for data for which the detection unit has determined that the preliminary process is necessary; and writing, by a saving processing unit, a second value corresponding to the data, wherein the first value is different from the second value when the detection unit has determined that the preliminary process is necessary.

According to the present disclosure, an excellent effect capable of shortening a processing time during data saving between memories can be obtained.

BRIEF DESCRIPTION OF THE DRAWINGS

FIG. 18 is a diagram illustrating an example of a dirty flag and a preliminary process flag according to a fourth modification example of the present disclosure;

FIG. 27 is a diagram illustrating a configuration example of a main memory management table according to the fifteenth modification example of the present disclosure;

DETAILED DESCRIPTION OF EMBODIMENTS

Hereinafter, embodiments to carry out the present disclosure (hereinafter, referred to as "embodiments") will be described. The description will be made in the following sequence.

1. First Embodiment (Example of carrying out a preliminary process on the basis of a preliminary process flag)

2. Second Embodiment (Example of carrying out the preliminary process during writing in a main memory)

3. Modification Examples

1. First Embodiment

Configuration of Information Processing System

Figure 1:
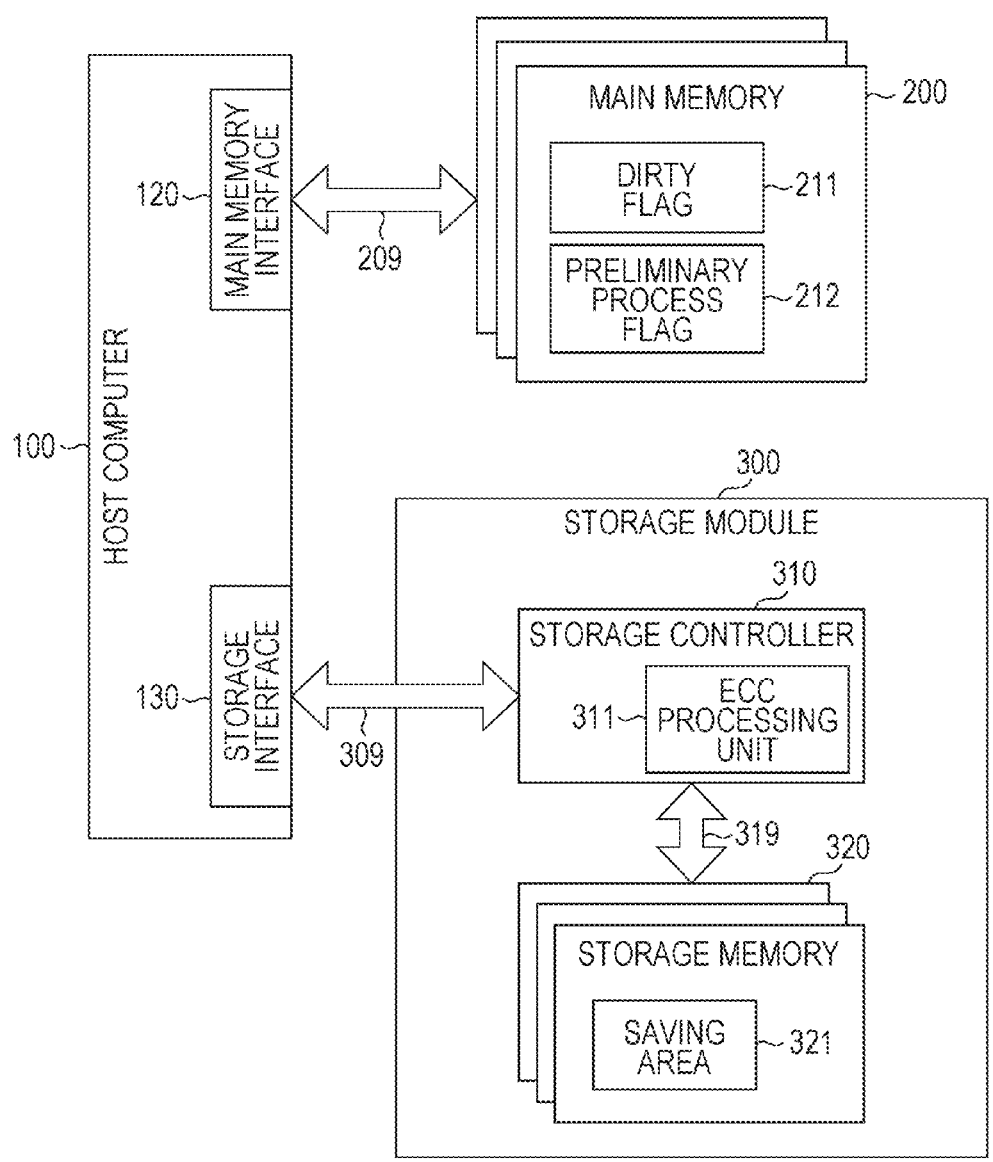
FIG. 1 is a diagram illustrating a configuration example of an information processing system according to a first embodiment of the present disclosure.

FIG. 1 shows a diagram illustrating a configuration example of an information processing system according to a first embodiment of the present disclosure. The information processing system includes a host computer 100, a main memory 200, and a storage module 300. A process of saving data, which is stored in the main memory 200, in the storage module 300 is referred to as a "saving process." In addition, a process of restoring data, which is saved in the storage module 300, to the main memory 200 is referred to as a "restoration process." In addition, the main memory 200 and the storage module 300 constitute a memory system.

The host computer 100 instructs or carries out each process in the information processing system. The host computer 100 includes a main memory interface 120 for connection with the main memory 200 and a storage interface 130 for connection with the storage module 300.

The main memory 200 is a memory that is used by the host computer 100 to carry out each process. For example, it is assumed that the main memory 200 is constituted by a volatile memory such as a DRAM. The main memory 200 is connected to the host computer 100 through a signal line 209. In addition, the main memory 200 is an example of a first memory described in claims.

The storage module 300 is a storage module that is used by the host computer 100 as an auxiliary storage. The storage module 300 is connected to the host computer 100 through a signal line 309. The storage module 300 includes a storage memory 320 that stores data, and a storage controller 310 that controls the storage memory 320.

For example, it is assumed that the storage memory 320 is constituted by a nonvolatile memory such as a resistance-variable memory (ReRAM). The storage memory 320 is divided into a saving area (suspend area) 321 where data of the main memory 200 is stored during system pause, and a typical area for typical data storage. In addition, the storage memory 320 is an example of a second memory described in claims.

The storage controller 310 includes an error check and correction (ECC) processing unit 311 that corrects an error of the storage memory 320. In addition, in this example, the ECC processing unit 311 is provided to the storage controller 310, but may be provided to the host computer 100 or the storage memory 320.

The main memory 200 includes a dirty flag 211 and a preliminary process flag 212 for each predetermined area. The dirty flag 211 is a flag that retains whether or not writing of data with respect to an area after being subjected to an immediately previous restoration process has been carried out. The preliminary process flag 212 is a flag that retains whether or not a necessary preliminary process has been carried out with respect to the area. A specific example of the dirty flag 211 and the preliminary process flag 212 will be described later.

Figure 2:
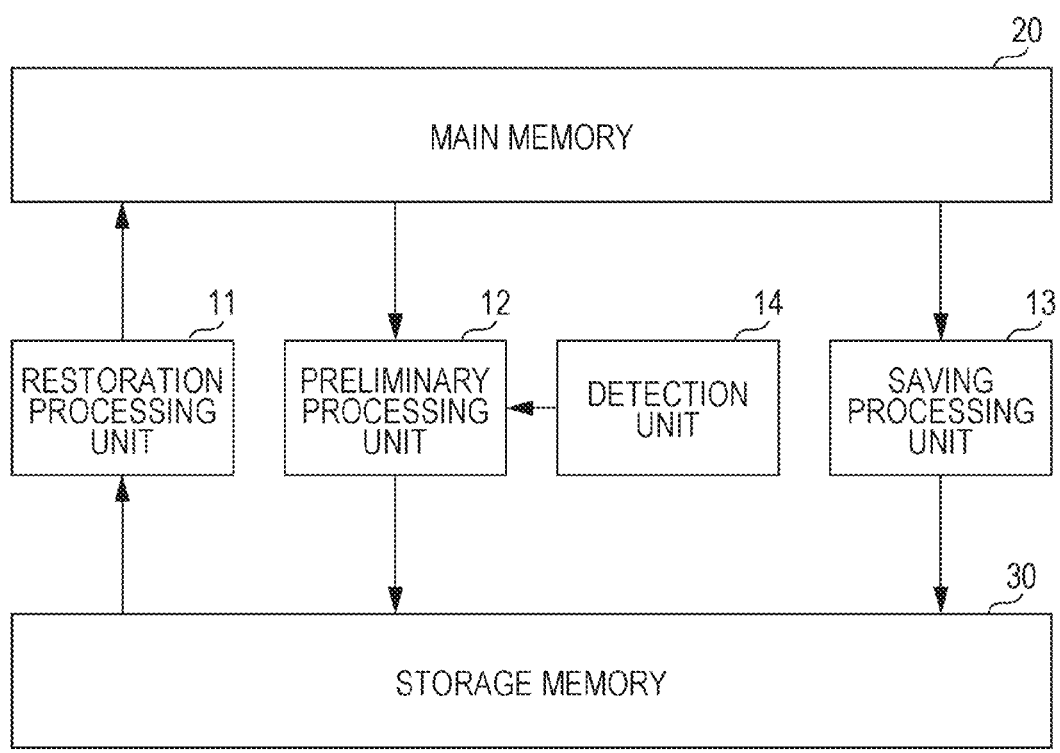
FIG. 2 is a diagram illustrating a functional configuration example of the information processing system according to the embodiment of the present disclosure.

FIG. 2 shows a diagram illustrating a functional configuration example of the information processing system according to this embodiment of the present disclosure. In FIG. 2, a main memory 20, a storage memory 30, a restoration processing unit 11, a preliminary processing unit 12, a saving processing unit 13, and a detection unit 14 are shown. The main memory 20 corresponds to the above-described main memory 200. The storage memory 30 corresponds to the above-described storage memory 320. Each cell of the main memory 20 and the storage memory 30 stores any one value of binary values "0" and "1" as bit data.

The restoration processing unit 11 carries out a restoration process of restoring data, which is saved in a saving area of the storage memory 30, to the main memory 20.

The detection unit 14 detects necessity for a preliminary process during saving of data, which is stored in the main memory 20, in a corresponding saving area of the storage memory 30. In the first embodiment, the detection unit 14 detects the necessity for the preliminary process on the basis of the preliminary process flag 212.

The preliminary processing unit 12 carries out a preliminary process in which one value of the binary values is written with respect to a saving area of data, for which necessity for the preliminary process is detected by the detection unit 14, in the storage memory 30. The preliminary process is carried out before the saving process to speed up the saving process.

The saving processing unit 13 writes a value corresponding to data to be saved with respect to a saving area in the storage memory 30 in which one of the binary values is written. With respect to a saving area for which a preliminary process is carried out, the other value of the binary values is written according to data to be saved. On the other hand, with respect to a saving area for which a preliminary process is not carried out, either one value or the other value of the binary values is written according to data to be saved.

Resistance State of Resistance-Variable Memory

Figure 3:
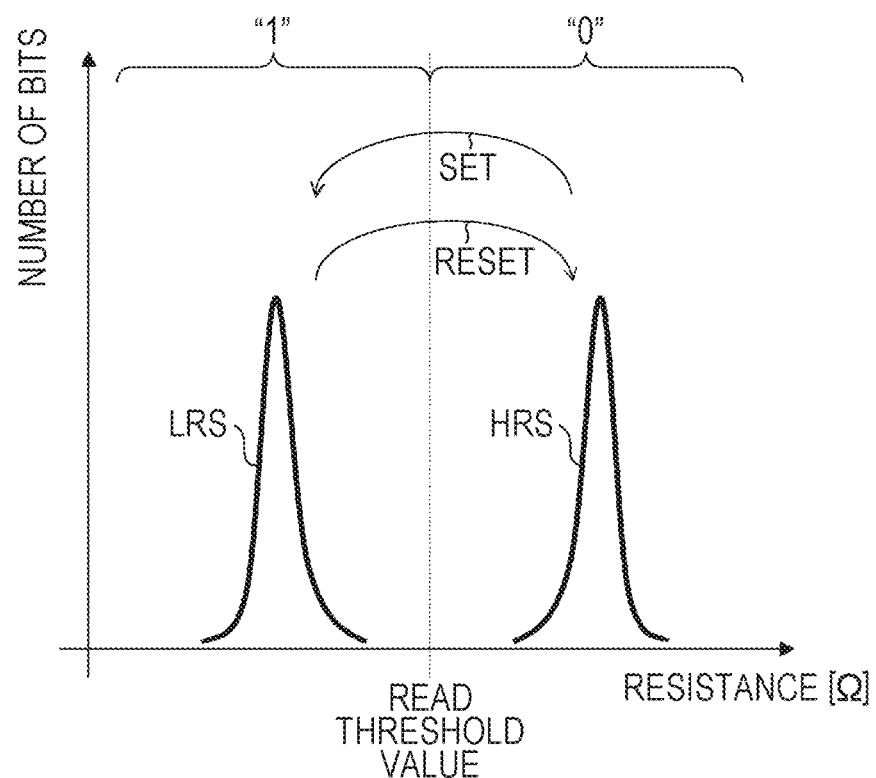
FIG. 3 is a diagram illustrating a resistance state of a resistance-variable memory.

FIG. 3 shows a diagram illustrating a resistance state of a resistance-variable memory. A memory cell of the resistance-variable memory transitions to a low resistance state (LRS) by a set operation, and transitions to a high resistance state (HRS) by a reset operation. When the resistance state is reversibly changed between the low resistance state and the high resistance state, a nonvolatile memory, which is capable of storing one bit using one memory cell, is realized.

In a case of using the resistance-variable memory as the storage memory 30 (320) according to this embodiment of the present disclosure, a resistance state is determined on the basis of a reference resistance value that is shown as a read threshold value. Hereinafter, description will be made with respect to an example in which data read out from a cell in the low resistance state is set to "1", and data read out from a cell in the high resistance state is set to "0", but the correlation between these numerical values and the data may be carried out in an arbitrary manner.

Figure 4A:
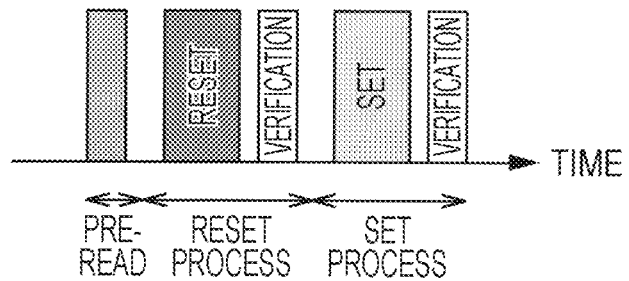
FIGS. 4A to 4C are diagrams illustrating an example of a voltage pulse that is applied to a memory cell of a storage memory according to the embodiment of the present disclosure.
Figure 4B:
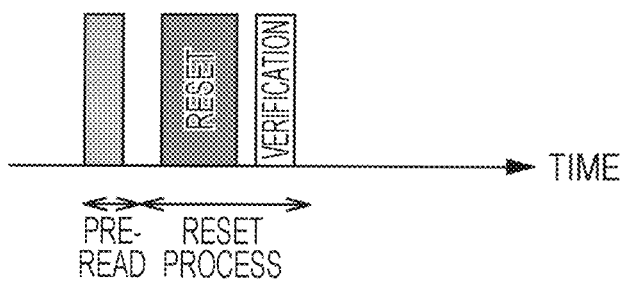
Figure 4C:
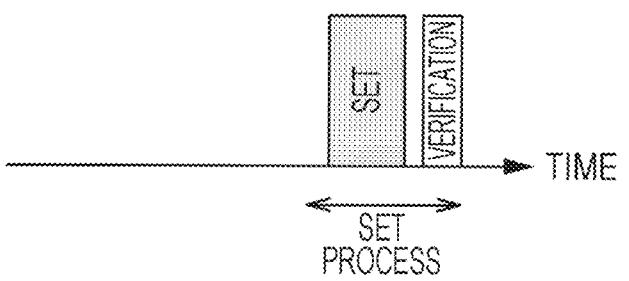

FIGS. 4A to 4C show diagrams illustrating an example of a voltage pulse that is applied to a memory cell of the storage memory 30 according to the embodiment of the present disclosure. In the drawings, FIG. 4A illustrates a type of voltage pulse in a case of typical writing. A typical writing operation is classified into three processes of a pre-read process, a reset process, and a set process. In addition, description will be made here with respect to an example in which the reset process is carried out first and then the set process is carried out. However, the set process may be carried out first and then the reset process may be carried out.

The pre-read process is a process of reading out a current value of a writing destination address, and comparing the value and data to be written from this with each other. The reset process is a process of selecting a bit cell to be inverted from "1" to "0" among respective bit cells of the address on the basis of the comparison result obtained in the pre-read process, and writing "0". The set process is a process of selecting a bit cell to be inverted from "0" to "1" among the respective bit cells of the address on the basis of a comparison result obtained in the pre-read process, and writing "1". In the reset process and the set process, after applying a voltage pulse for the reset and the set, verification is carried out to confirm whether or not the writing is correctly carried out.

In the typical writing, for example, in a case where the pre-read result is "0011", and the writing data is "1010", the reset process is carried out by selecting only the lowermost bit, and then the set process is carried out by selecting only the uppermost bit. In the second bit and the third bit, existing values are retained without carrying out any process. Here, as an example, when an access unit to the storage memory 30 is set as 2 KB, and total time necessary for the pre-read process, the reset process, and the set process is set as 2 μs (microsecond), a transmission rate becomes 1 GB/second.

In the embodiment of the present disclosure, a method in which operations other than the set process in the typical writing are carried out in advance is carried out to speed up the saving process. That is, as shown in FIG. 4B, when writing in the main memory 20 occurs, as a preliminary process, the pre-read process and the reset process are carried out in advance with respect to the saving area of the storage memory 30. According to this, when carrying out the saving process, as shown in FIG. 4C, only the set process may be carried out and thus the high speed of the saving process may be realized. The writing according to only the set process is referred to as high-speed writing.

For example, when an access unit to the storage memory 30 is set as 2 KB, and time taken for the set process is set to 1 μs, the transmission rate during the high-speed writing according to this embodiment of the present disclosure becomes 2 GB/second.

However, after the writing in the main memory 20 occurs, the saving process may be carried out in a state in which the preliminary process is not carried out in time due to an arbitrary reason. In this case, it is necessary to carry out the pre-read process, the reset process, and the set process according to the typical writing.

Dirty Flag

Figure 5:
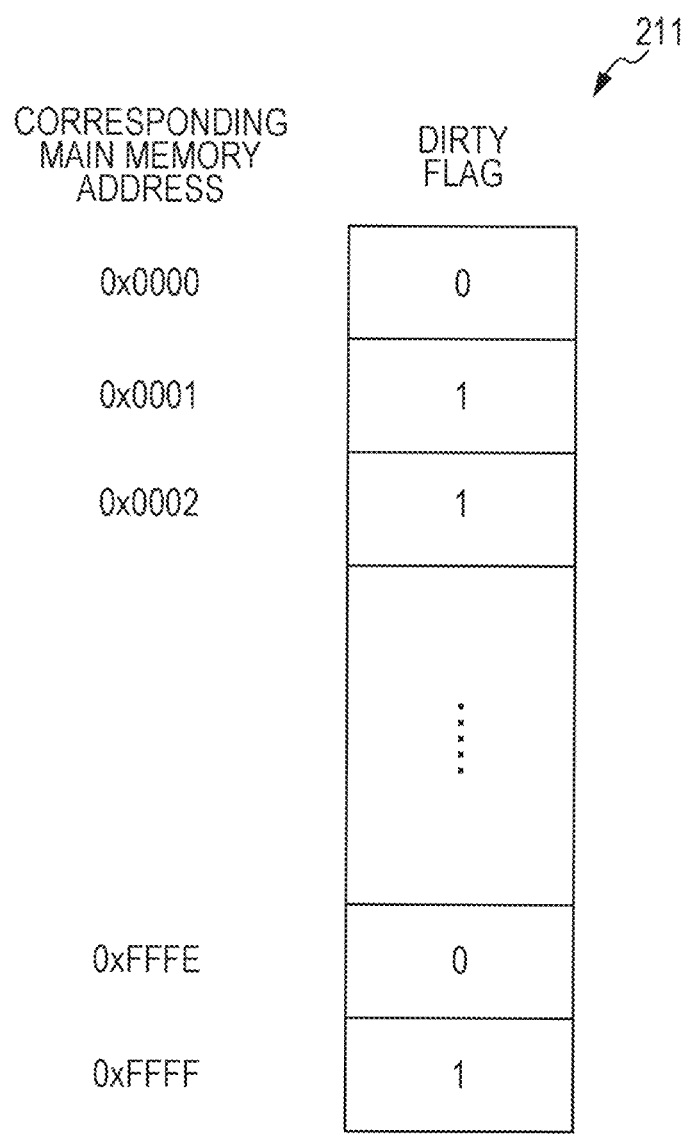
FIG. 5 is a diagram illustrating an example of a dirty flag according to the embodiment of the present disclosure.

FIG. 5 shows a diagram illustrating an example of the dirty flag 211 according to the embodiment of the present disclosure. As described above, the dirty flag 211 is a flag that retains whether or not writing of data with respect to an area after being subjected to an immediately previous restoration process has been carried out. The dirty flag 211 is stored on the main memory 200, and the host computer 100 updates the dirty flag 211 by using the main memory interface 120 with reference to the same.

In this example, the dirty flag 211 is provided for each word of the main memory 200 in a corresponding manner, and retains a flag of one bit. When writing in a corresponding word of the main memory 200 occurs, the dirty flag 211 is set to "1", and when the saving process is carried out, the dirty flag 211 is set to "0".

In a case where the dirty flag 211 shows "1", this case means that after carrying out an immediately previous restoration process, writing of data is carried out with respect to the word. On the other hand, in a case where the dirty flag 211 shows "0", this case means that after carrying out the immediately previous restoration process, the writing of data is not carried out with respect to the word.

Preliminary Process Flag

Figure 6:
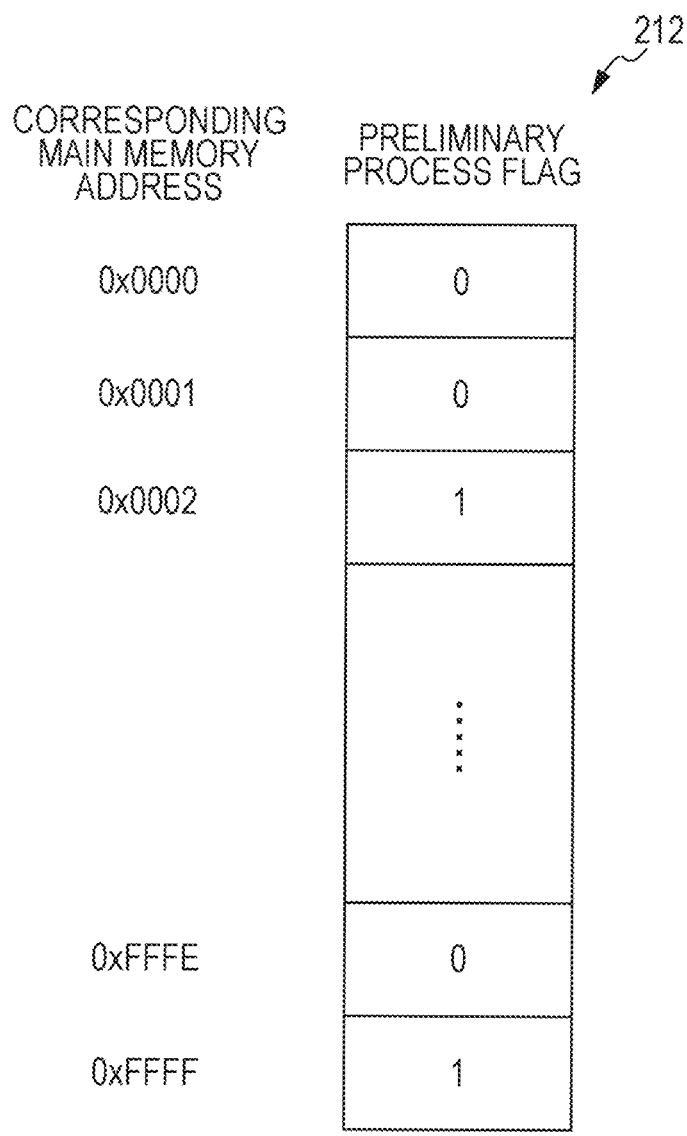
FIG. 6 is a diagram illustrating an example of a preliminary process flag according to the embodiment of the present disclosure.

FIG. 6 shows a diagram illustrating an example of the preliminary process flag 212 according to the embodiment of the present disclosure. As described above, the preliminary process flag 212 is a flag that retains whether or not a necessary preliminary process has been carried out with respect to the area. The preliminary process flag 212 is stored on the main memory 200, and the host computer 100 updates the preliminary process flag 212 using the main memory interface 120 with reference to the same.

In this example, the preliminary process flag 212 is provided for each word of the main memory 200 in a corresponding manner, and retains a flag of one bit. When writing in a corresponding word of the main memory 200 occurs, the preliminary process flag 212 is set to "1", and when the preliminary process is completed, the preliminary process flag 212 is set to "0".

In a case where the preliminary process flag 212 shows "1", this case means that a preliminary process to be carried out with respect to the word is present. That is, in a case where the dirty flag 211 shows "1" and the preliminary process flag 212 shows "1", this case means that a necessary preliminary process is not carried out. In a case where the dirty flag 211 shows "1" and the preliminary process flag 212 shows "0", this case means that a necessary preliminary process is carried out.

In addition, in a case where the dirty flag 211 is "0", the preliminary process flag 212 also becomes "0". This case means that a preliminary process to be carried out with respect to the word is not present.

Operation of Information Processing System

Figure 7:
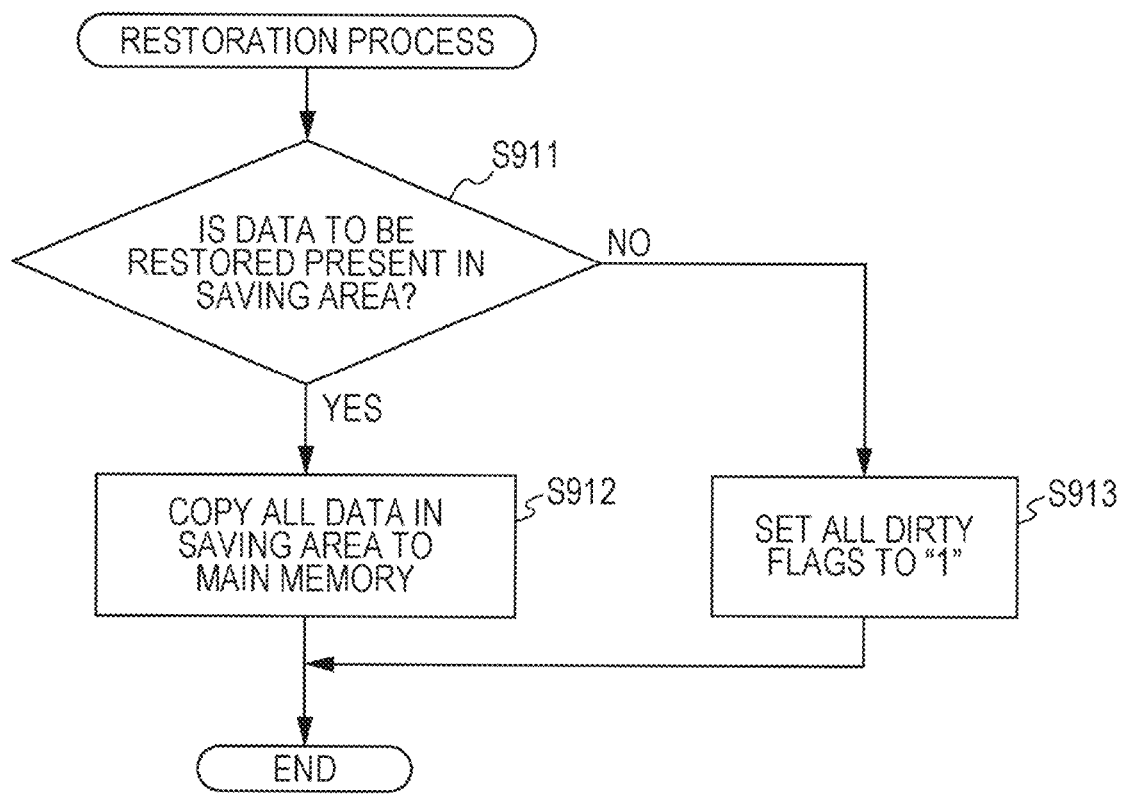
FIG. 7 is a flowchart illustrating a procedure example of a restoration process according to the first embodiment of the present disclosure.

FIG. 7 shows a flowchart illustrating a procedure example of the restoration process according to the first embodiment of the present disclosure. In a case where it is detected that the power of the host computer 100 is turned on, in a case where a restoration instruction is input from a user, or in a case where the host computer 100 autonomously determines the necessity for the restoration process, host computer 100 initiates the restoration process. According to this, all of data of the saving area 321 of the storage memory 320 is copied to the main memory 200 (step S912). However, in a case such as an initial activation of a system, data to be restored may not be present. In this case (No in step S911), the copying from the saving area 321 to the main memory 200 is not carried out, and instead of this copying, all dirty flags 211 are set to "1" (step S913)

Figure 8:
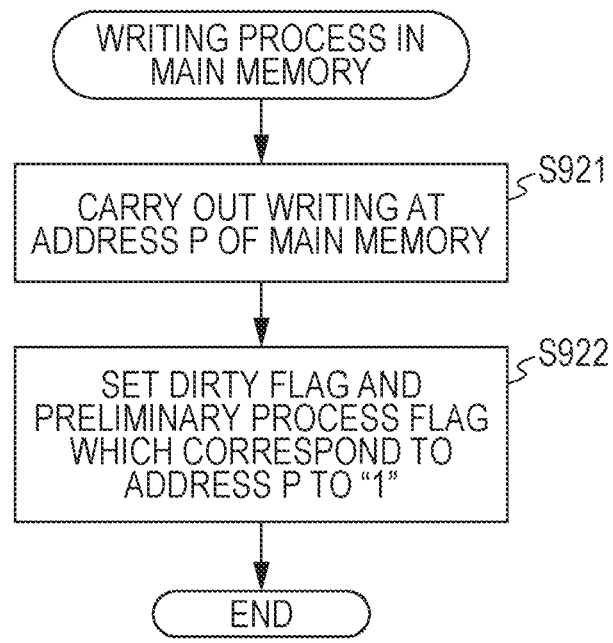
FIG. 8 is a flowchart illustrating a procedure example of a writing process in a main memory according to the first embodiment of the present disclosure.

FIG. 8 shows a flowchart illustrating a procedure example of a writing process in the main memory 200 according to the first embodiment of the present disclosure. The host computer 100 writes data in the main memory 200 during a course of carrying out various processes (step S921). Here, an address at which data is written is set as an address P. Whenever the writing at the address P of the main memory 200 is carried out, the host computer 100 sets the dirty flag 211 and the preliminary process flag 212, which correspond to the address P, to "1" (step S922).

Figure 9:
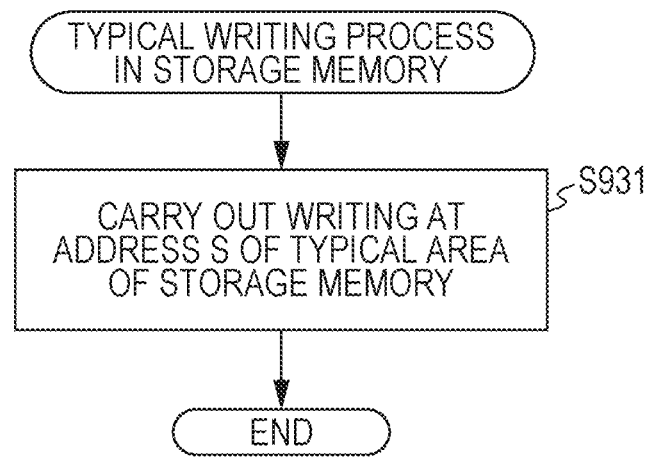
FIG. 9 is a flowchart illustrating a procedure example of a writing process in a storage memory according to the first embodiment of the present disclosure.

FIG. 9 shows a flowchart illustrating a procedure example of a writing process in a storage memory 320 according to the first embodiment of the present disclosure. The host computer 100 may write data in the storage memory 320 during the course of carrying out various processes (step S931). As described above, in addition to the saving area 321, a typical area for typical writing is present in the storage memory 320. When writing data with respect to the typical area, typical writing is used instead of high-speed writing.

Figure 10:
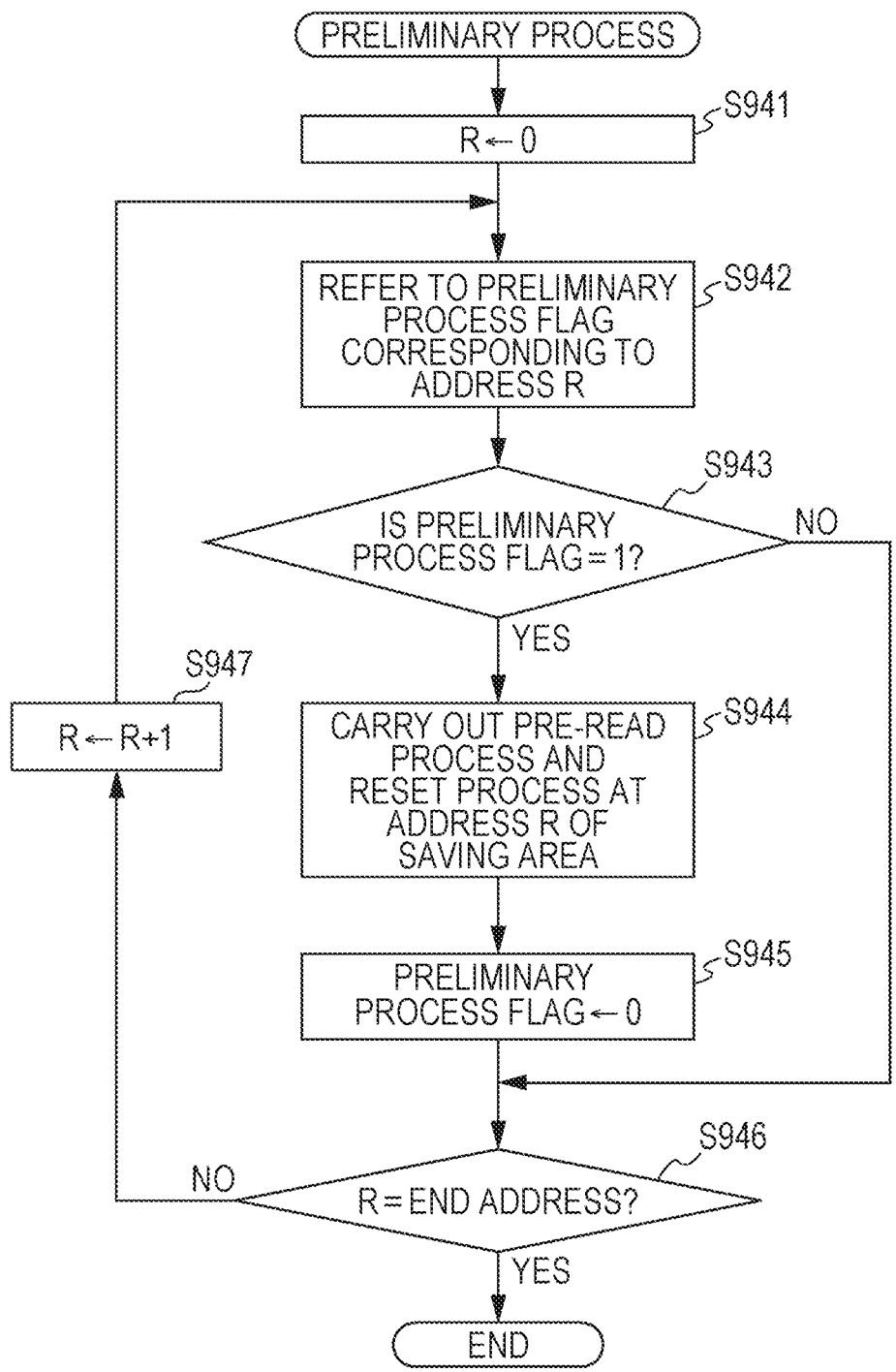
FIG. 10 is a flowchart illustrating a procedure example of a preliminary process on the storage memory according to the first embodiment of the present disclosure.

FIG. 10 shows a flowchart illustrating a procedure example of a preliminary process on the storage memory 320 according to the first embodiment of the present disclosure. The host computer 100 checks necessity for the preliminary process for regular constant time intervals with respect to each address of the main memory 200. Here, an address that is an object of the preliminary process is set as an address R. As an initial value, "0" is set in R (step S941).

The host computer 100 refers to the preliminary process flag 212 that corresponds to the address R (step S942). In addition, in a case where the preliminary process flag 212 shows "1" (Yes in step S943), the host computer 100 carries out the pre-read process and the reset process with respect to the saving area of the storage memory 320 which corresponds to the address R (step S944). According to this, "0" is written in all bits of the saving area that correspond to the address R of the storage memory 320. When the pre-read process and the reset process are completed, the preliminary process flag 212 is set to "0" (step S945). On the other hand, in a case where the preliminary process flag 212 shows "0" (No in step S943), these processes are not carried out.

The above-described processes are repeated until they reach an end address (step S946) while adding a value of R one by one (step S947).

Here, the host computer 100 may sequentially transmit a command for carrying out the pre-read process, data in which all bits are set to "0", and a command for carrying out the reset process with respect to the storage module 300. In addition, in the storage module 300, a dedicated command for carrying out a preliminary process may be prepared, and only the command may be transmitted without transmitting data "0".

Figure 11:
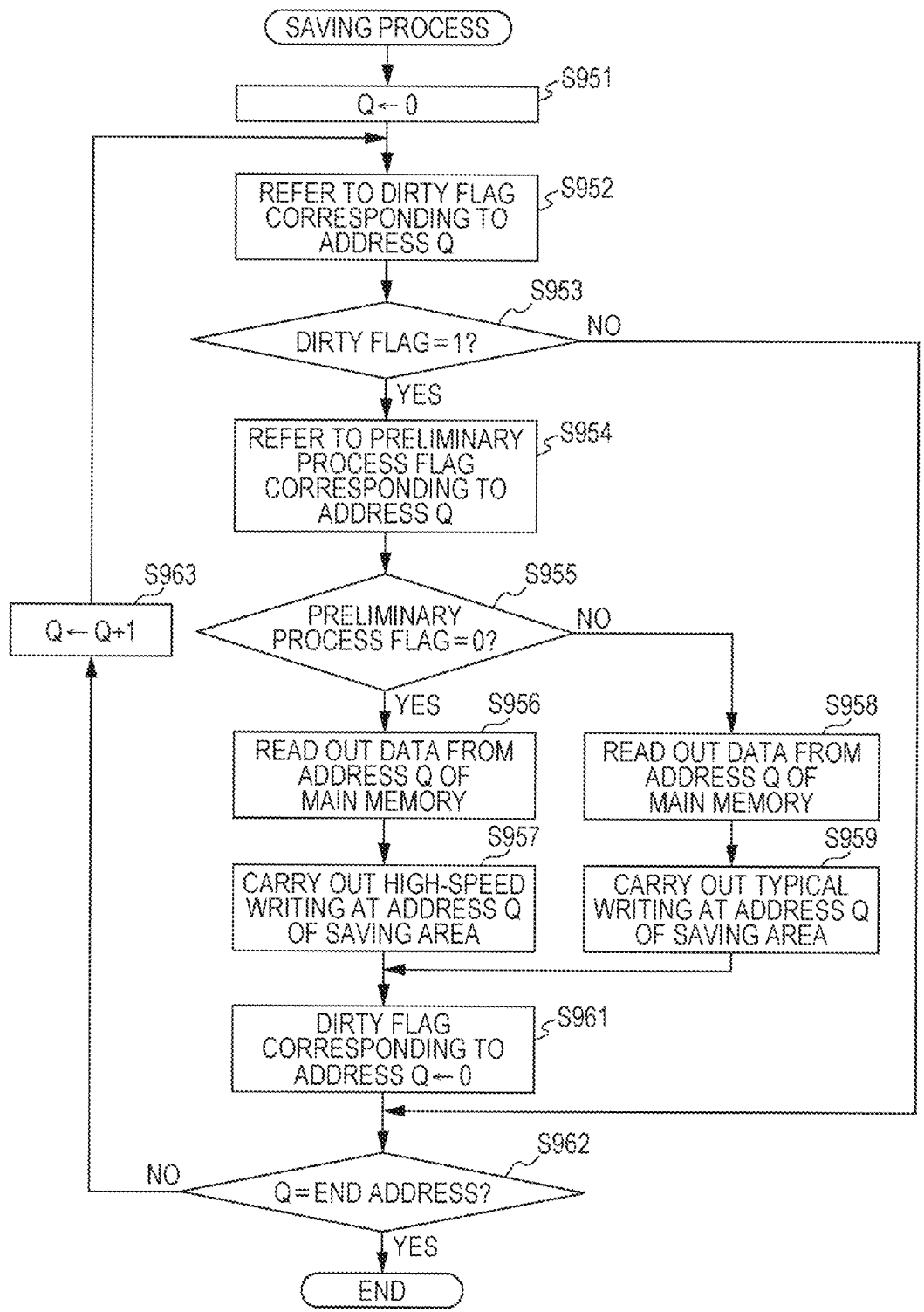
FIG. 11 is a flowchart illustrating a procedure example of a saving process in the storage memory according to the first embodiment of the present disclosure.

FIG. 11 shows a flowchart illustrating a procedure example of a saving process in the storage memory 320 according to the first embodiment of the present disclosure. In a case where a saving instruction is input from a user, or in a case where the host computer 100 autonomously determines the necessity for the saving process, the host computer 100 initiates the saving process. Here, an address that is an object of the saving process is set as an address Q. As an initial value, "0" is set in Q (step S951).

The host computer 100 refers to the dirty flag 211 that corresponds to the address Q (step S952). In addition, in a case where the dirty flag 211 shows "1" (Yes in step S953), the following processes up to step S961 relating to the address Q are carried out. On the other hand, in a case where the dirty flag 211 shows "0" (No in step S953), the processes relating to the address Q are not carried out.

The host computer 100 refers to the preliminary process flag 212 that corresponds to the address Q (step S954). In addition, in a case where the preliminary process flag 212 shows "0" (Yes in step S955), data is read out from the address Q of the main memory 200 (step S956), and high-speed writing is carried out in the saving area 321 of the address Q (step S957). That is, in this case, writing according to only the set process is carried out with respect to the storage memory 320.

On the other hand, in a case where the preliminary process flag 212 shows "1" (No in step S955), data is read out from the address Q of the main memory 200 (step S958), and the typical writing is carried out in the saving area 321 of the address Q (step S959). That is, in this case, writing according to the pre-read process, the reset process, and the set process are carried out with respect to the storage memory 320.

After step S957 or step S959 is completed, the dirty flag 211 that corresponds to the address Q is cleared to "0" (step S961).

The above-described processes are repeated until they reach an end address (step S962) while adding a value of Q one by one (step S963).

As described above, in the first embodiment of the present disclosure, necessity for saving is detected using the preliminary process flag 212, and the preliminary process is carried out on the basis of a detection result, and thus high-speed saving process can be realized.

2. Second Embodiment

Configuration of Information Processing System

Figure 12:
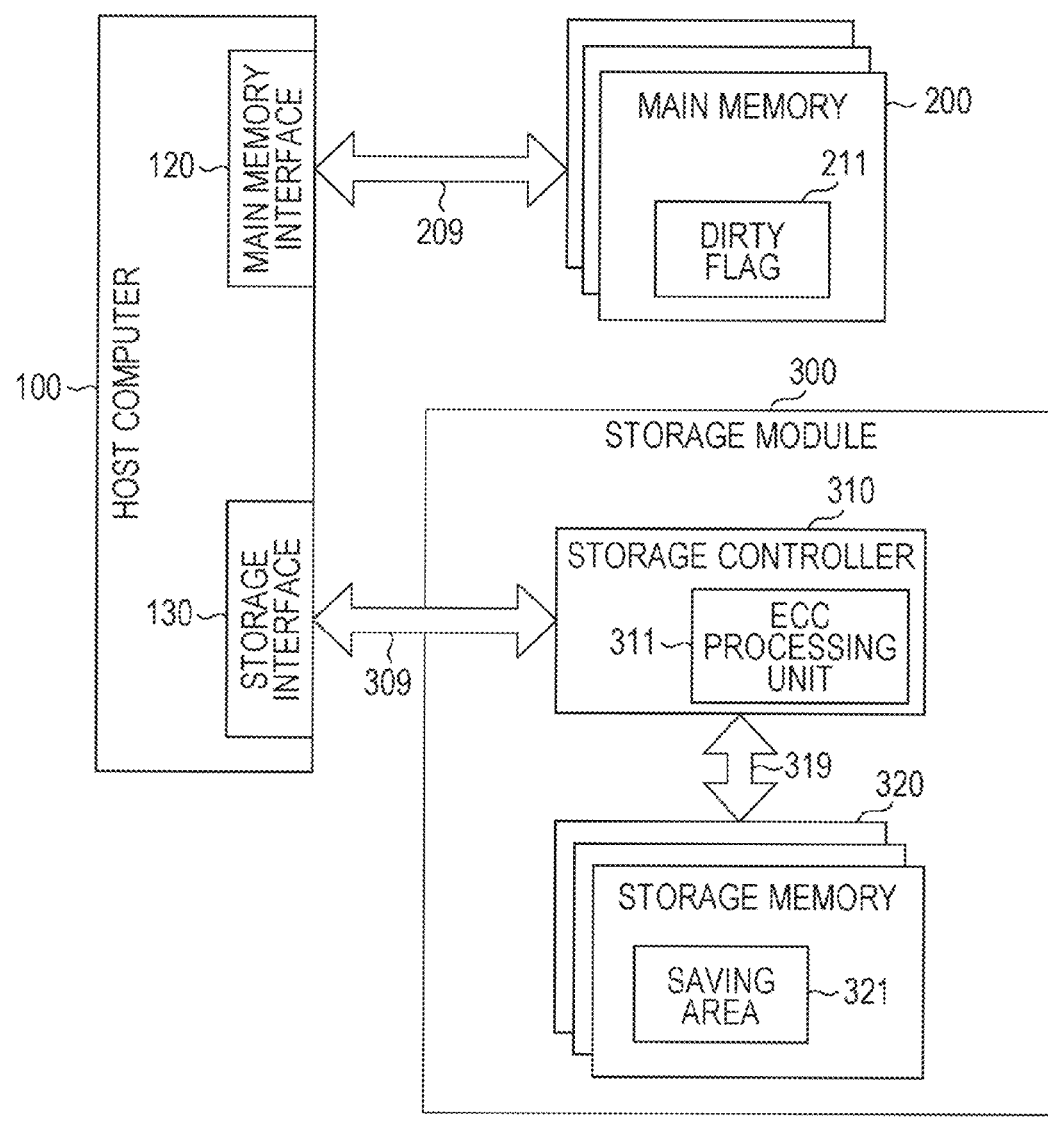
FIG. 12 is a diagram illustrating a configuration example of an information processing system according to a second embodiment of the present disclosure.

FIG. 12 shows a diagram illustrating a configuration example of an information processing system according to a second embodiment of the present disclosure. With regard to an overall configuration, the information processing system according to the second embodiment is the same as the case of the first embodiment, and thus description thereof will not be repeated here. However, the second embodiment is different from the first embodiment in that the preliminary process flag 212 is not provided. In the second embodiment, the host computer 100 quickly carries out the preliminary process whenever writing in the main memory 200 is carried out. That is, in the second embodiment, the detection unit 14 detects necessity for the saving according to writing in the main memory 200. According to this, the preliminary process may be completed before the saving process is carried out without using the preliminary process flag 212.

Operation of Information Processing System

In the information processing system according to the second embodiment, with respect to the restoration process and the writing process in the storage memory 320 are the same as the case of the first embodiment, and thus description thereof will not be repeated here.

Figure 13:
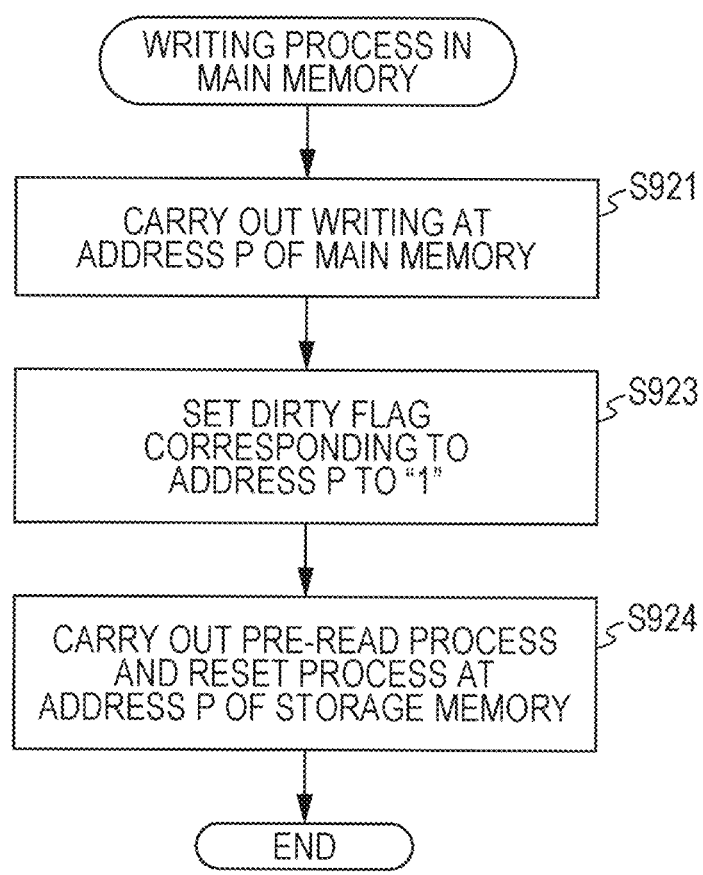
FIG. 13 is a flowchart illustrating a procedure example of a writing process in a main memory according to the second embodiment of the present disclosure.

FIG. 13 shows a flowchart illustrating a procedure example of a writing process in the main memory 200 according to the second embodiment of the present disclosure. The host computer 100 writes data in the main memory 200 during the course of carrying out various processes (step S921). Here, an address at which data is written is set as an address P. Whenever the writing at the address P of the main memory 200 is carried out, the host computer 100 sets the dirty flag 211, which corresponds to the address P, to "1" (step S923). In addition, the pre-read process and the reset process are carried out with respect to a saving area of the storage memory 320 which corresponds to the address P (step S924).

Figure 14:
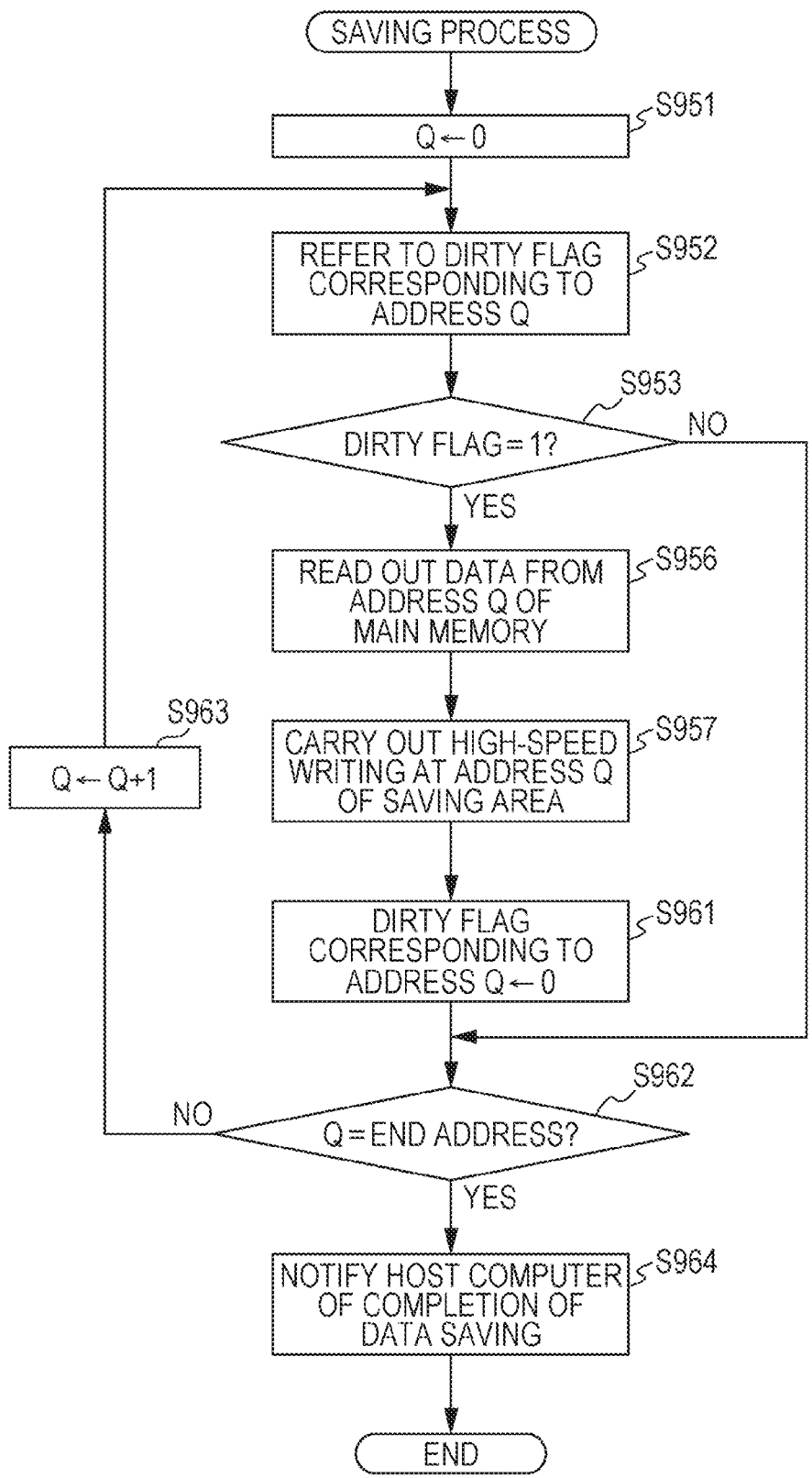
FIG. 14 is a flowchart illustrating a procedure example of a saving process in a storage memory according to the second embodiment of the present disclosure.

FIG. 14 shows a flowchart illustrating a procedure example of the saving process in the storage memory 320 according to the second embodiment of the present disclosure. In a case where a saving instruction is input from a user, or in a case where the host computer 100 autonomously determines the necessity for the saving process, the host computer 100 initiates the saving process. Here, an address that is an object of the saving process is set as an address Q. As an initial value, "0" is set in Q (step S951).

The host computer 100 refers to the dirty flag 211 that corresponds to the address Q (step S952). In addition, in a case where the dirty flag 211 shows "1" (Yes in step S953), the following processes up to step S961 regarding the address Q are carried out. On the other hand, in a case where the dirty flag 211 shows "0" (No in step S953), the process regarding the address Q is not carried out.

The host computer 100 reads out data from the address Q of the main memory 200 (step S956), and high-speed writing in the saving area 321 of the address Q is carried out (step S957). That is, writing is carried out only in the set process with respect to the storage memory 320. In addition, in the second embodiment, a preliminary process is carried out during the writing in the main memory 200, and thus the saving process according to the typical writing is not carried out.

After step S957 is completed, the dirty flag 211 that corresponds to the address Q is cleared to "0" (step S961).

The above-described processes are repeated until they reach an end address (step S962) while adding a value of Q one by one (step S963). After the processes are carried out until they reach the end address (Yes in step S962), the host computer 100 is notified of an instruction indicating that data saving is completed (step S964).

As described above, in the second embodiment of the present disclosure, the necessity for saving is detected according to the writing in the main memory 200, and the preliminary process is carried out on the basis of the detection result, and thus high-speed saving process can be realized.

3. Modification Examples

Hereinafter, modification examples on the assumption of the above-described first embodiment will be described, but these modification examples may be applied to the second embodiment in the same manner.

First Modification Example

Figure 15:
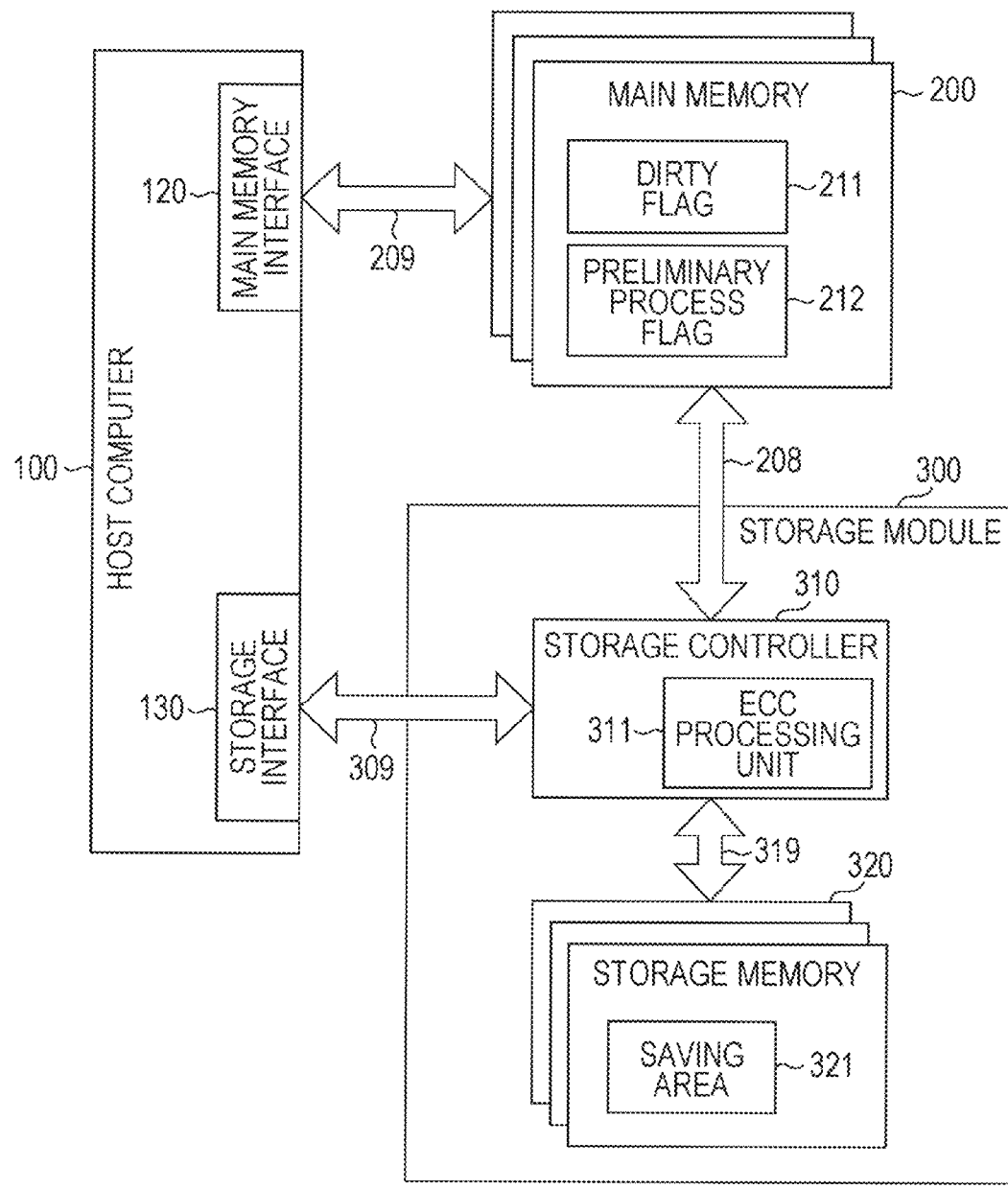
FIG. 15 is a diagram illustrating a configuration example of an information processing system according to a first modification example of the present disclosure.

FIG. 15 shows a diagram illustrating a configuration example of an information processing system according to a first modification example of the present disclosure. In the above-described first embodiment, data transmission between the main memory 200 and the storage module 300 is carried out according to an instruction from the host computer 100, but in the first modification example, the data transmission is carried out without mediation of the host computer 100. Specifically, the main memory 200 and the storage module 300 are connected through a signal line 208, and a mechanism that directly carries out data transmission through the signal line 208 is provided. When carrying out saving of an area for which the preliminary process is completed, the host computer 100 only transmits a saving command to the storage controller 310 by using the mechanism without reading out data from the main memory 200.

The storage controller 310 that receives the saving command autonomously carries out the saving process shown in FIG. 11. That is, the storage controller 310 refers to the dirty flag 211 and the preliminary process flag 212 on the main memory 200, and carries out data saving from the main memory 200 to the storage memory 320 in response to the reference value. When the saving process is completed, "saving completion" is notified from the storage controller 310 to the host computer 100.

In a typical case, since the saving process is carried out during system suspension, after the host computer 100 issues the saving command, writing is not carried out with respect to an area of the main memory 200 in which data is saved before receiving "saving completion". However, for example, a user may carry out a keyboard operation and the like, and thus it may be necessary for the writing in the area of the main memory 200, in which data is saved, to be carried out. In this case, the host computer 100 continues writing in the main memory 200 after transmitting a command indicating "saving stoppage" to the storage controller 310. When receiving "saving stoppage", the storage controller 310 sets the dirty flag 211 of an address during the saving process to "1", and completes the saving process. In this case, the completion notification from the storage controller 310 to the host computer 100 is not carried out.

In addition, when receiving a restoration command, the storage controller 310 autonomously carries out the restoration process shown in FIG. 7, and then notifies the host computer 100 of "restoration completion". After issuing the restoration command, the host computer 100 does not carry out an access to the main memory 200 of an area to be restored before receiving "restoration completion".

Similarly, the storage controller 310 autonomously carries out the preliminary process shown in FIG. 10 without an instruction from the host computer 100. In addition, in the first modification example, as is the case with the first embodiment, the preliminary process may be carried out by the host computer 100.

Second Modification Example

Figure 16:
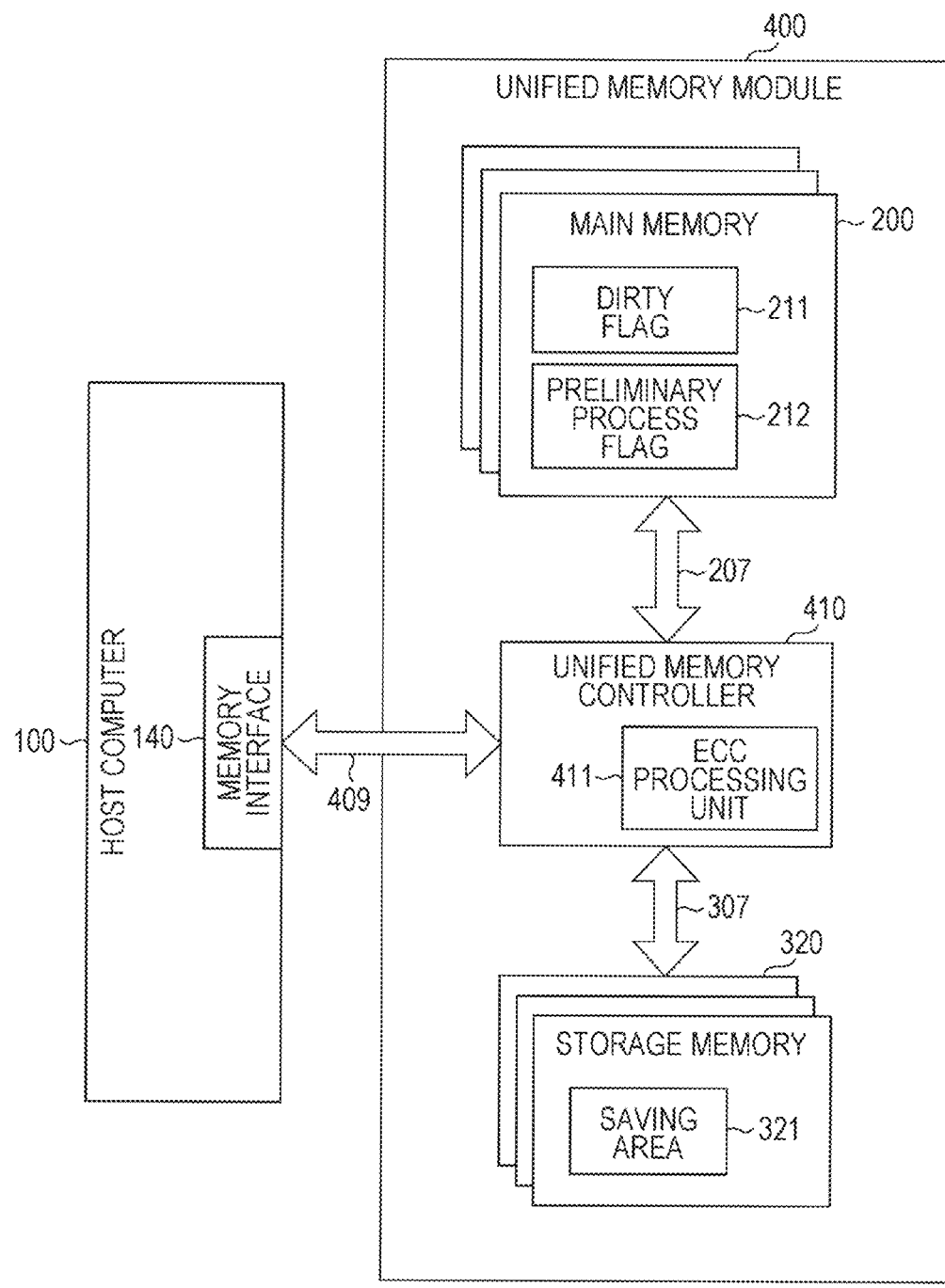
FIG. 16 is a diagram illustrating a configuration example of an information processing system according to a second modification example of the present disclosure.

FIG. 16 shows a diagram illustrating a configuration example of an information processing system according to a second modification example of the present disclosure. In the above-described first embodiment, the host computer 100 individually gives an instruction to the main memory 200 and the storage memory 320. However, in the second modification example, the main memory 200 and the storage memory 320 are handled in a unified manner. That is, the main memory 200 and the storage memory 320 are unified in a unified memory module 400 and are controlled by a unified memory controller 410 of the unified memory module 400.

The host computer 100 includes a memory interface 140 for connection to the unified memory module 400. The unified memory controller 410 is connected to the memory interface 140 through a signal line 409. The unified memory controller 410 includes an ECC processing unit 411 that corrects an error of the storage memory 320. In addition, in this example, the ECC processing unit 411 is provided to the unified memory controller 410, but may be provided to the host computer 100 or the storage memory 320.

Similar to the first modification example, in the saving process or the restoration process, the host computer 100 only transmits a command of initiation of saving or initiation of restoration to the unified memory controller 410, and the saving process or the restoration process is carried out by the unified memory controller 410. Similar to this, the preliminary process is also autonomously carried out by the unified memory controller 410. Further, in the second modification example, when writing in the main memory 200 from the host computer 100 is carried out, an operation of setting the dirty flag 211 and the preliminary process flag 212 of a corresponding address to "1" is also carried out by the unified memory controller 410.

In the second modification example, data transmission control between the main memory 200 and the storage memory 320 can be independently carried out by the unified memory module 400 without mediation of the host computer 100.

Third Modification Example

Figure 17:
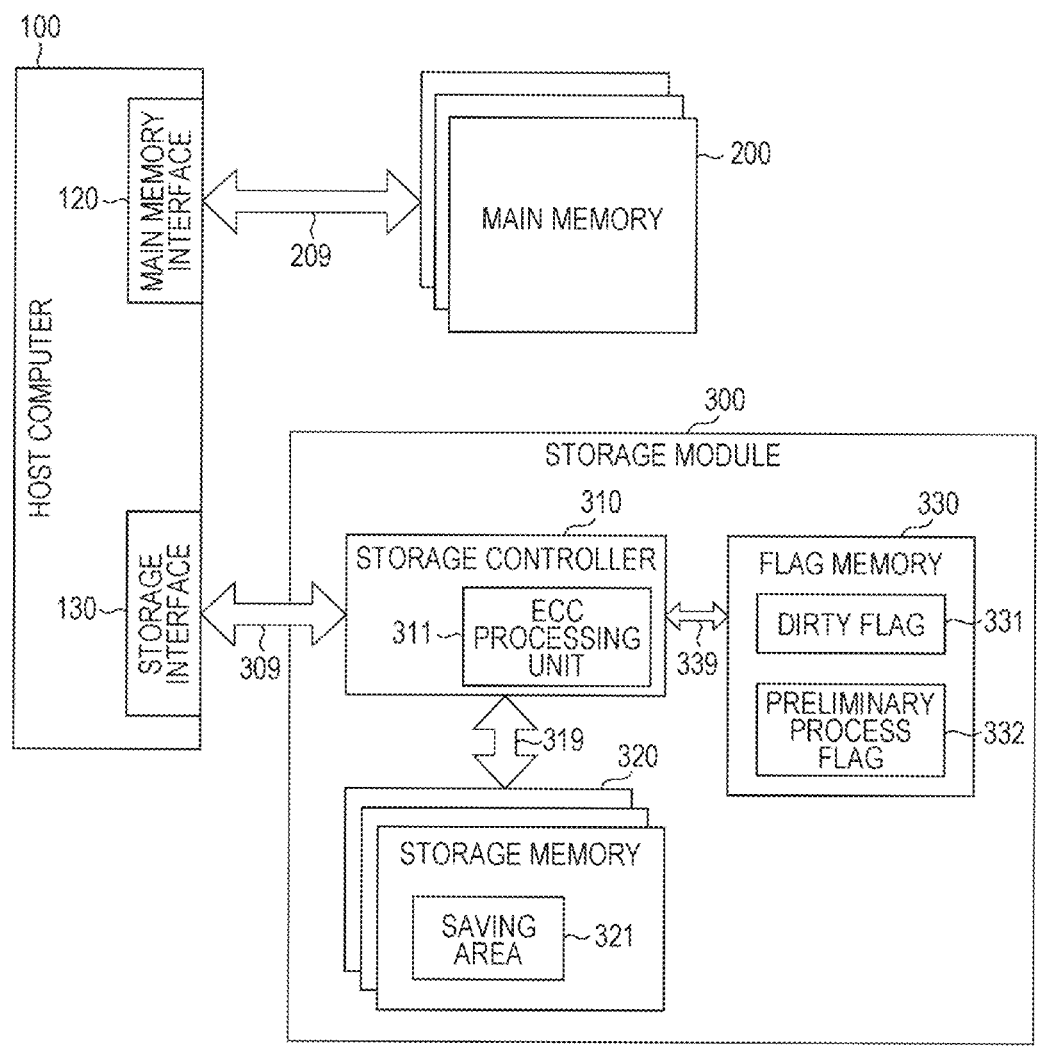
FIG. 17 is a diagram illustrating a configuration example of an information processing system according to a third modification example of the present disclosure.

FIG. 17 shows a diagram illustrating a configuration example of an information processing system according to a third modification example of the present disclosure. In the above-described first embodiment, the dirty flag 211 and the preliminary process flag 212 are retained by the main memory 200. However, in the third modification example, a dedicated flag memory 330 is provided to the storage module 300. The flag memory 330 retains the flag as the dirty flag 331 and the preliminary process flag 332.

The host computer 100 carries out updating with reference to the dirty flag 331 and the preliminary process flag 332 by using the storage interface 130. In the first embodiment, a partial region of the main memory 200 is used for writing of a flag, but in the third modification example, the main memory 200 is not used. In addition, access to the flag is carried out for reading-out and writing in a bit unit, and thus when a dedicated memory in which an access unit is smaller than that of the main memory 200 is provided, access delay or power consumption can be reduced.

Fourth Modification Example

In the above-described first embodiment, it is assumed that the dirty flag 211 and the preliminary process flag 212 are written for each address of the main memory 200, but a flag of one bit may be provided for each specific address range of the main memory 200. FIG. 18 shows a diagram illustrating an example of a dirty flag 211 and a preliminary process flag 212 according to a fourth modification example of the present disclosure.

For example, when a minimum access unit of the main memory 200 is set as 64 bits, and a minimum access unit of the storage memory 320 is set as 1 Kbyte, as shown in the same drawing, with respect to 16 addresses adjacent to each other, the main memory 200 includes the dirty flag 211 of one bit and the preliminary process flag 212 of one bit. At this time, for example, in a range of 0x0000 to 0x000F, in a case where writing in the main memory 200 occurs in any one bit, the host computer 100 sets a corresponding dirty flag 211 to "1".

In the fourth modification example, the dirty flag 211 and the preliminary process flag 212 are provided for each specific address range, and thus a storage area necessary for both of the flags can be reduced.

Fifth Modification Example

Figure 19:
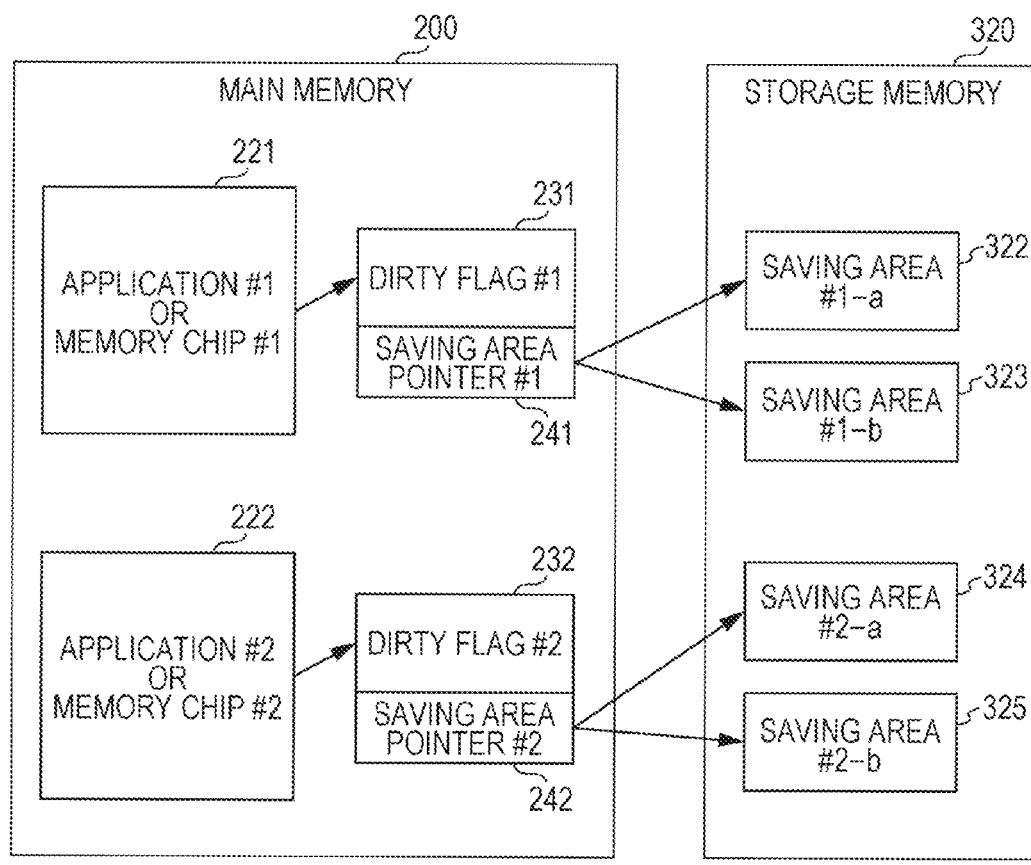
FIG. 19 is a diagram illustrating a relational example between a dirty flag and a saving area according to a fifth modification example of the present disclosure.

In the above-described first embodiment, it is assumed that one saving area corresponding to the dirty flag 211 is provided, but a plurality of the saving areas may be provided. FIG. 19 shows a diagram illustrating a relational example between the dirty flag 211 and the saving area according to a fifth modification example of the present disclosure. An address space of the main memory 200 is divided into plural parts (for example, spaces 221 and 222)

having an arbitrary size, and dirty flags 231 and 232 are provided with the respective spaces set as virtual address spaces.

In addition, a saving area that corresponds to each dirty flag is prepared in one or more number of saving areas with respect to one dirty flag. For example, saving areas 322 and 323 are prepared for the dirty flag 231, and saving areas 324 and 325 are prepared for the dirty flag 232. In addition, a pointer that indicates a position of the saving area is provided for each dirty flag so as to discriminate to which saving area the dirty flag corresponds. Here, for example, the pointer means a leading address of the saving area that corresponds to the dirty flag in a total address space of the storage memory 320.

For example, in a case where the main memory 200 is constituted by a plurality of memory chips, if the dirty flag is prepared for each memory chip, power saving of a system may be realized by carrying out the data saving with respect to only an arbitrary memory chip, and by shutting off or limiting power supply to the memory chip.

In addition, in a system capable of simultaneously executing a plurality of applications, for each of the applications during execution, a dirty flag of a memory space that is allocated for the application may be created. When the saving process is carried out with respect to an application which waits an input from a user or which becomes a background job, a part of the main memory may be opened or power thereof may be shut off.

Sixth Modification Example

Figure 20A:
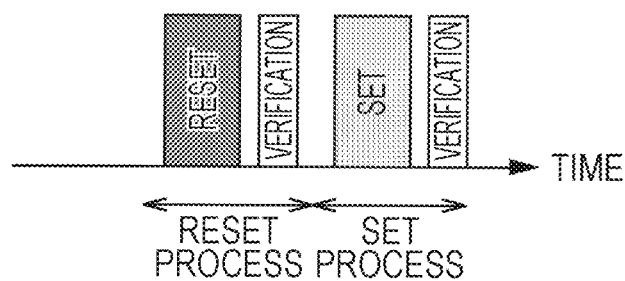
FIGS. 20A to 20C are diagrams illustrating an example of a voltage pulse that is applied to a memory cell of a storage memory according to a sixth modification example of the present disclosure.
Figure 20B:
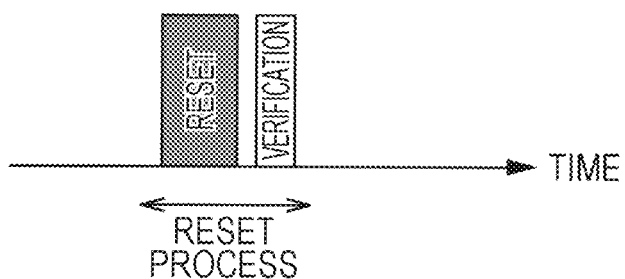
Figure 20C:
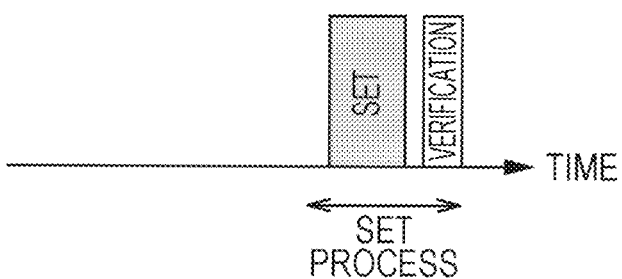

In the above-described first embodiment, it is assumed that the typical writing operation is classified into three processes of the pre-read process, the reset process, and the set process. In contrast, an operation may be possible even when omitting the pre-read process depending on characteristics of the storage memory 320. FIGS. 20A to 20C show diagrams illustrating a voltage pulse that is applied to a memory cell of a storage memory according to the sixth modification example of the present disclosure.

In this case, in the reset process and the set process, regardless whether a current state of a bit cell before writing is "1" or "0", when the bit of data that is written is "1", a set pulse is applied to total bits, and when the bit is "0", a reset pulse is applied to the total bits. Accordingly, the reset process is carried out without carrying out the pre-read process in the preliminary process according to writing data, and the set process is carried out in the high-speed writing according to writing data.

In the sixth modification example, it is possible to save a time necessary for the pre-read process in comparison to the first embodiment, and thus a total writing time becomes fast. On the other hand, when the pre-read process is not carried out, there is a possibility that the same value may be successively written in a bit cell, and thus consumption of a rewriting lifespan of the cell may speed up. Accordingly, it is necessary to select the content of the writing operation according to characteristics of the storage memory 320.

Seventh Modification Example

In the above-described first embodiment, it is assumed that the set process is carried out after carrying out the reset process. In contrast, the reset process may be carried out after carrying out the set process. That is, when referring to the preliminary process flag of the address R, in a case where the value thereof is "1", "1" is written to all bits of the address in the pre-read process and the set process. In addition, with regard to the saving process, when referring to the preliminary process flag of the address Q, in a case where the value thereof is "0", the set process is carried out in advance, and thus data of the main memory 200 in the address Q can be written in the saving area according to only the reset process.

Eighth Modification Example

In the above-described first embodiment, when writing in the main memory 200 occurs, the host computer 100 updates the dirty flag 211 and the preliminary process flag 212, but the operation may be carried out by a component other than the host computer 100.

For example, in the first modification example (FIG. 15) or the third modification example (FIG. 17), during writing in the main memory 200, the host computer 100 transmits a write destination address of the main memory 200 to the storage controller 310. According to this, instead of the host computer 100, the storage controller 310 can update the dirty flag 211 and the preliminary process flag 212.

In addition, in the second modification example (FIG. 16), the unified memory controller 410 typically receives a writing address in the main memory 200 from the host computer 100. Accordingly, instead of the host computer 100, the unified memory controller 410 can update the dirty flag 211 and the preliminary process flag 212.

Ninth Modification Example

In the above-described first embodiment, the host computer 100 carries out the preliminary process with reference to the preliminary process flag 212 for regular constant time intervals, but the operation may be carried out by a component other than the host computer 100.

For example, in the first modification example (FIG. 15) or the third modification example (FIG. 17), storage controller 310 can access to the dirty flag 211 or the preliminary process flag 212 without mediation of the host computer 100. Similarly, the unified memory controller 410 of the second modification example (FIG. 16) can access to the dirty flag 211 or the preliminary process flag 212 without mediation of the host computer 100. According to this, the preliminary process can be carried out for regular constant time intervals without an instruction from the host computer 100.

Tenth Modification Example

In the above-described first embodiment, the host computer 100 carries out the saving process and the restoration process, but these processes may be carried out by a component other than the host computer 100.

For example, in the first modification example (FIG. 15) or the third modification example (FIG. 17), the storage controller 310 may carry out the saving process or the restoration process after receiving an initiation instruction from the host computer 100. Similarly, the unified memory controller 410 of the second modification example (FIG. 16) may carry out the saving process or the restoration process after receiving an initiation instruction from the host computer 100.

At this time, only a command that indicates "initiation of saving" or "initiation of restoration" may be transmitted to the storage controller 310 or the unified memory controller 410 from the host computer 100. Reference of the dirty flag 211 or the preliminary process flag 212, and data transmission between the main memory 200 and the storage memory 320 are carried out by the storage controller 310 or the unified memory controller 410. In addition, the storage controller 310 or the unified memory controller 410 notifies the host computer 100 of completion of saving or restoration. After receiving the notification indicating completion of data saving, the host computer 100 turns off power of the main memory 200, the storage memory 320, the storage controller 310 or the unified memory controller 410, and the like. In this case, the entirety of a system may be allowed to transition to a power saving state without turning off the power.

Eleventh Modification Example

In the above-described first embodiment, as shown in FIGS. 4A to 4C, it is assumed that the pulse application for each of the reset process and the set process is carried out once. In contrast, depending on characteristics of the storage memory 320, the pulse application may be appropriately carried out in plural times during each of the reset process and the set process. For example, since a variation is present in writing characteristics of cells, with regard to the majority of cells, normal writing is possible with two times of pulse. On the other hand, four times of pulse may be necessary for normal writing in a minute number of remaining cells.

Figure 21A:
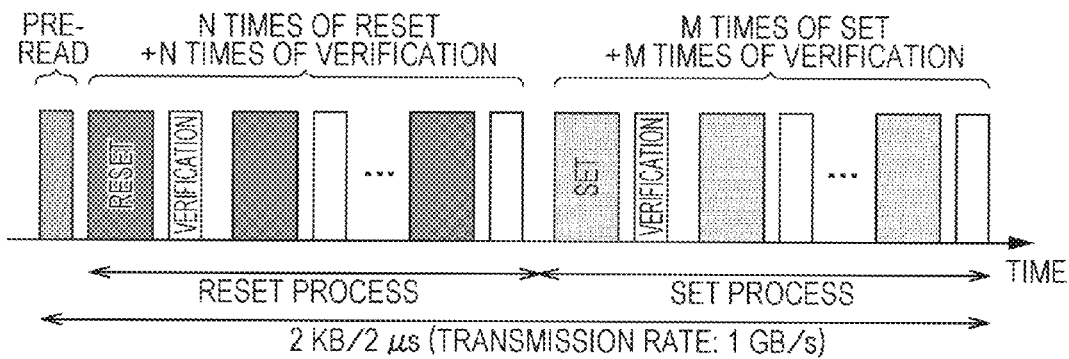
FIGS. 21A to 21C are diagrams illustrating an example of a voltage pulse that is applied to a memory cell of a storage memory according to an eleventh modification example of the present disclosure.
Figure 21B:
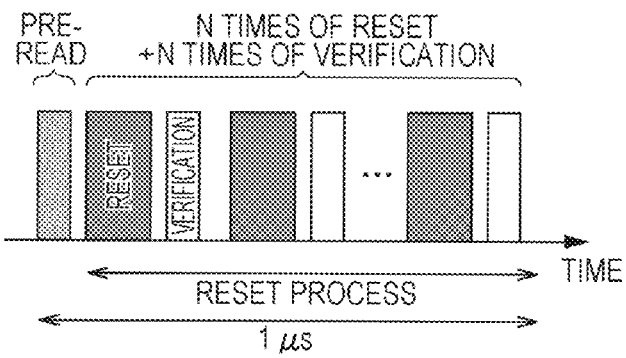
Figure 21C:
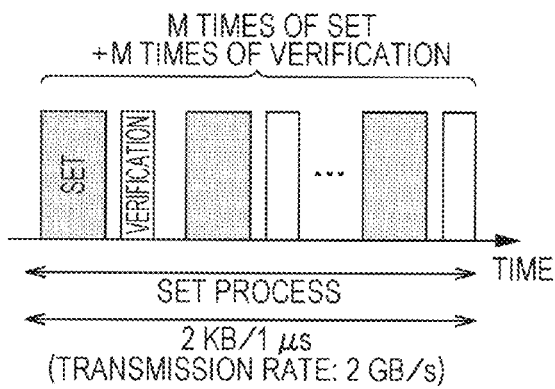

FIGS. 21A to 21C show diagrams illustrating an example of a voltage pulse that is applied to a memory cell of the storage memory 30 according to the eleventh modification example of the present disclosure. The reset process is carried out by one or more times of reset pulse and 0 or more times of verification read. A voltage for writing of "0" in a bit cell is applied by the reset pulse for a constant time, and then a bit cell state is read out by the verification read. Then, it is examined whether or not "0" is correctly written. Next, the reset pulse is applied again with respect to a bit cell for which correct writing is not carried out with the pulse of the first time, and then the verification read is carried out. These are repeated N times, and then the reset process is completed. Similarly, in the set process, a voltage for writing of "1" in a bit cell is applied by a set pulse for a constant time, and then a process of verification read is repeated M times.

Similar to the above-described first embodiment, in the eleventh modification example, the pre-read process and the reset process are carried out during the preliminary process, and the set process is carried out during the subsequent saving process. However, similar to the above-described seventh modification example, the pre-read process and the set process may be carried out during the preliminary process, and the reset process may be carried out during the subsequent saving process. In addition, similar to the above-described sixth modification example, the pre-read process may be omitted depending on characteristics of the storage memory 320.

Twelfth Modification Example

In the above-described eleventh modification example, it is assumed that N times of reset pulse application and M times of set pulse application are applied, but the number of pulse applications may be reduced with respect to the saving process. The number of pulse applications in the typical writing is set in such a manner that even when a power shut-off state is maintained for a long period of time (for example, 10 years), sufficient reliability can be maintained. According to this, when reducing the number of pulse applications, occurrence of errors increases in comparison to a case of the typical writing. However, retention of data can be guaranteed for a short period of time (for example, one week) on the assumption of use of the ECC. That is, under a use environment that after saving of data, the data is restored in a short period of time in many cases, a time necessary for the data saving can be shortened by writing in which the number of pulse application is reduced. Therefore, in the twelfth modification example, in the writing with respect to a typical area, pulse application is carried out in the number of times shown in the eleventh modification example. On the other hand, in the writing with respect to the saving area, the number of pulse application is reduced.

Figure 22A:
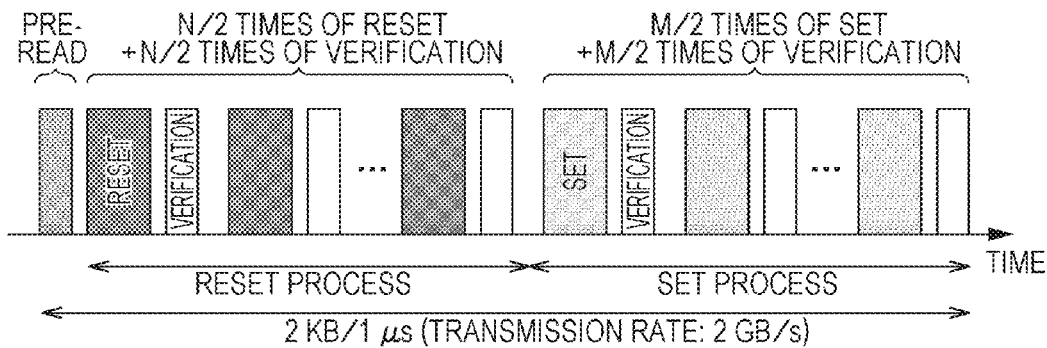
FIGS. 22A to 22C are diagrams illustrating an example of a voltage pulse that is applied to a memory cell of a saving area of a storage memory according to a twelfth modification example of the present disclosure.
Figure 22B:
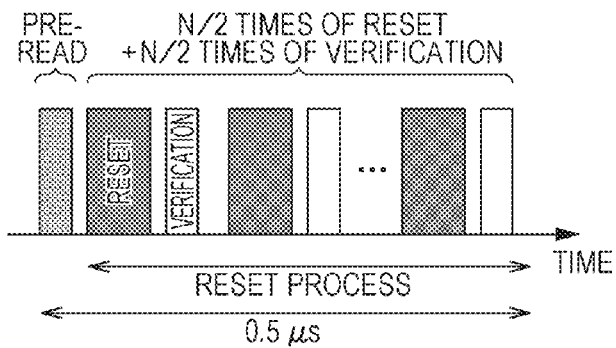
Figure 22C:
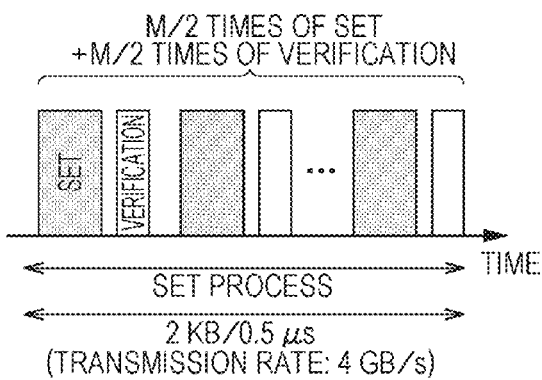

FIGS. 22A to 22C show diagrams illustrating an example of a voltage pulse that is applied to a memory cell of the saving area of the storage memory 30 according to the twelfth modification example of the present disclosure. In the twelfth modification example, in the writing with respect to the saving area, the number of pulse applications in the reset process and the set process is reduced by half in comparison to the writing in the typical area. That is, in the reset process, N/2 times of reset pulse application and N/2 times of verification are carried out, and in the set process, N/2 times of set pulse application and N/2 times of verification are carried out.

In the twelfth modification example, similar to the above-described first embodiment, the pre-read process and the reset process are carried out during the preliminary process, and the set process is carried out during the subsequent saving process. However, similar to the above-described seventh modification example, the pre-read process and the set process may be carried out during the preliminary process, and the reset process may be carried out during the subsequent saving process. In addition, similar to the above-described sixth modification example, the pre-read process may be omitted depending on characteristics of the storage memory 320.

Figure 23:
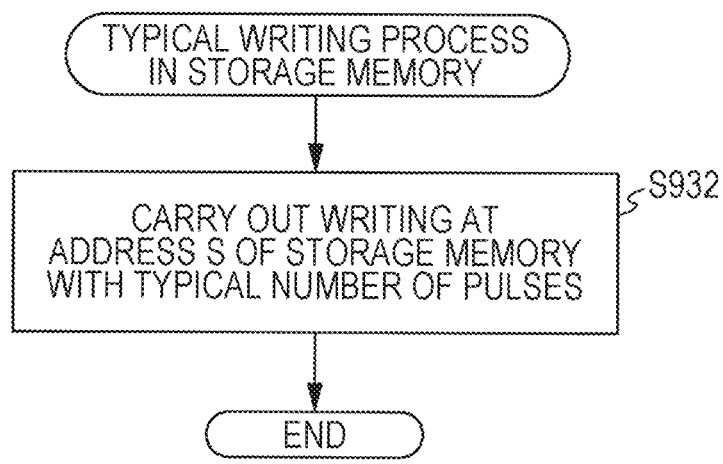
FIG. 23 is a flowchart illustrating a procedure example of a writing process in a storage memory according to the twelfth modification example of the present disclosure.

FIG. 23 shows a flowchart illustrating a procedure example of the writing process in the storage memory 320 according to the twelfth modification example of the present disclosure. In the twelfth modification example, in the writing with respect to the saving area, the number of pulse applications is reduced by half. However, when writing data in a typical area, writing with a typical number of pulse applications, which is not reduced by half, is carried out (step S932).

Figure 24:
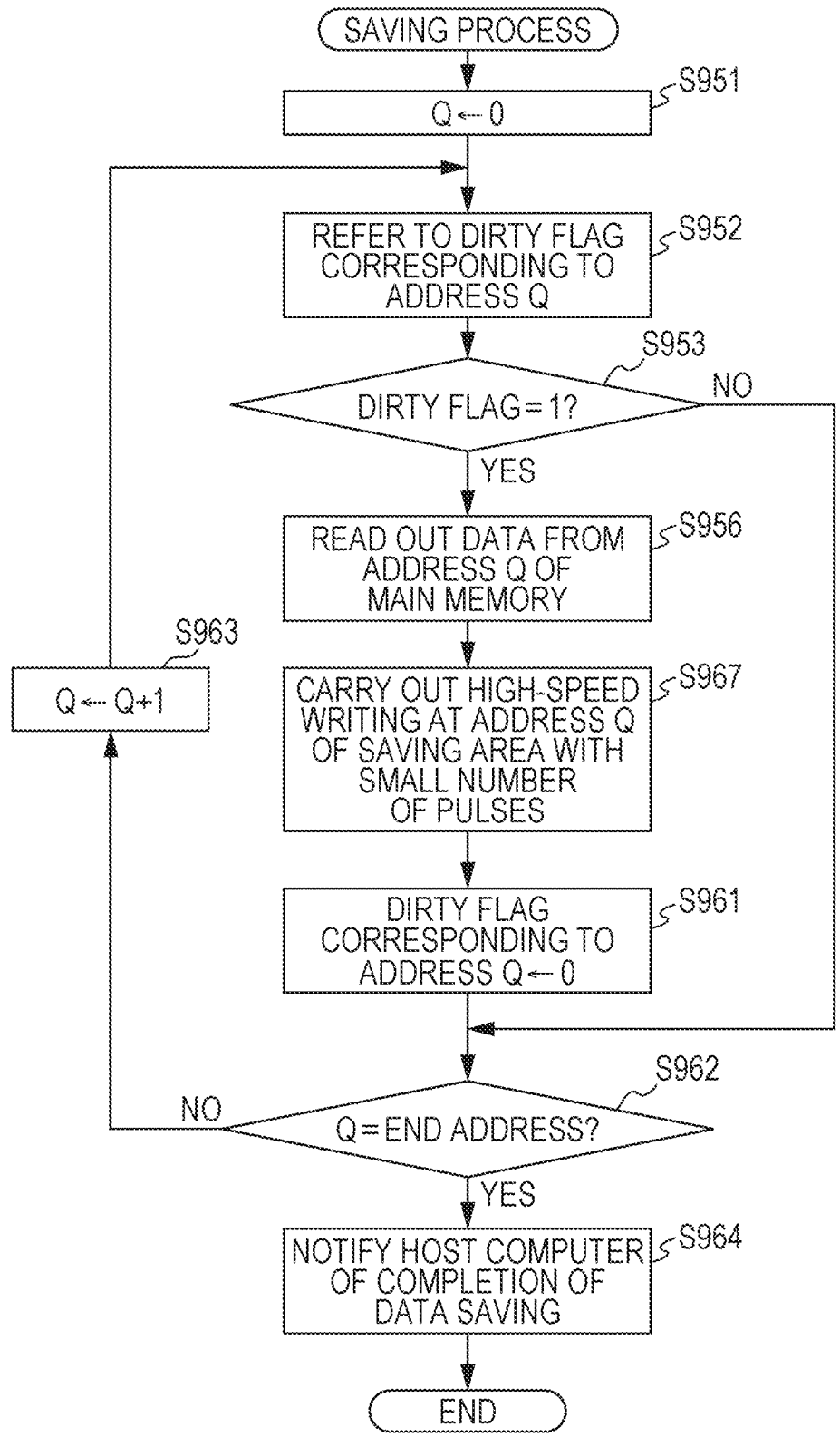
FIG. 24 is a flowchart illustrating a procedure example of a saving process in the storage memory according to the twelfth modification example of the present disclosure.

FIG. 24 shows a flowchart illustrating a procedure example of the saving process in the storage memory 320 according to the twelfth modification example of the present disclosure. The procedure example in the twelfth modification example is basically the same as the saving process in the first embodiment shown in FIG. 11. However, the procedure example of the twelfth modification example is different from that of the first embodiment in that the number of pulse application is reduced by half when carrying out writing in the saving area (step S967).

In the twelfth modification example, the number of pulse applications when carrying out writing in the saving area is reduced in comparison to a case of the typical area, and thus high-speed saving process can be realized.

Thirteenth Modification Example

In the above-described twelfth modification example, the number of pulse applications when carrying out writing in the saving area is reduced, but even when a pulse width is made narrow, the same effect as the twelfth modification example can be obtained.

Figure 25A:
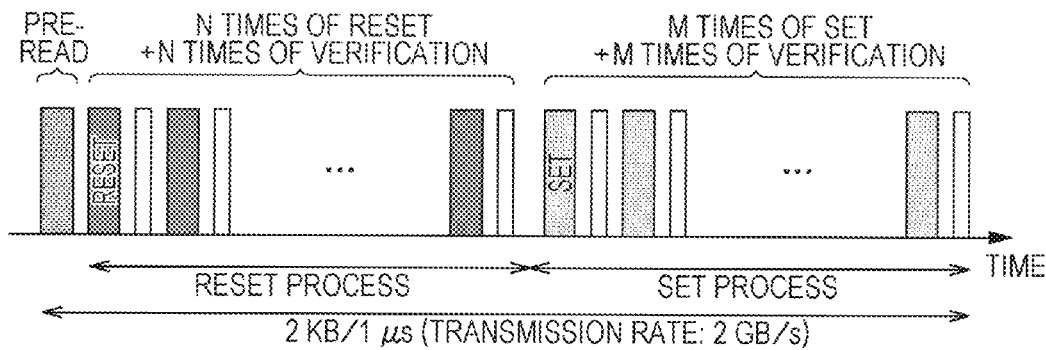
FIGS. 25A to 25C are diagrams illustrating an example of a voltage pulse that is applied to a memory cell of a saving area of a storage memory according to a thirteenth modification example of the present disclosure.
Figure 25B:
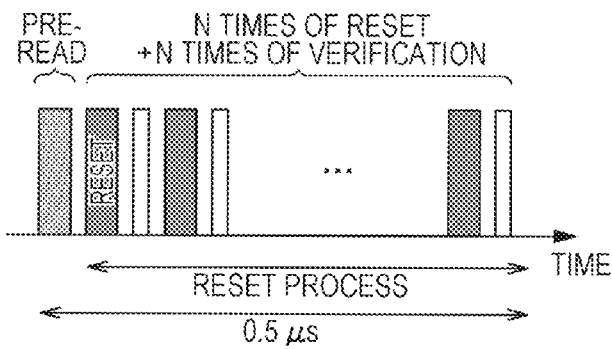
Figure 25C:
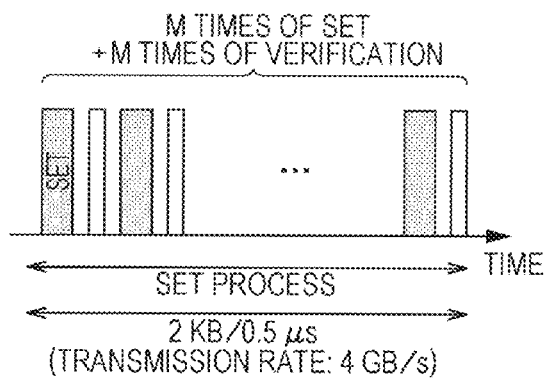

FIGS. 25A to 25C show diagrams illustrating an example of a voltage pulse that is applied to a memory cell of the saving area of the storage memory 30 according to a thirteenth modification example of the present disclosure. In the thirteenth modification example, in the writing with respect to the saving area, a pulse width during the reset process and the set process is reduced by half in comparison to the writing in the typical area.

In the thirteenth modification example, a pulse width when carrying out the writing in the saving area is made narrower in comparison to a case of the typical area, and thus high-speed saving process can be realized. In addition, in this example, the pulse width of the writing pulse is made narrow, but a voltage or a current may be made weak with respect to the writing pulse. That is, in the writing with respect to the saving area, a pulse application voltage during the reset process and the set process may be made lower in comparison to the writing with respect to the typical area. In addition, in the writing with respect to the saving area, a current of a pulse during the reset process and the set process may be made smaller in comparison to the writing with respect to the typical area.

Fourteenth Modification Example

In the above-described twelfth and thirteenth modification examples, since the number of pulse application or the pulse width is reduced in the writing with respect to the saving area, data retention in the saving area can be guaranteed only for a short period of time. Therefore, to guarantee data retention even in a case where the system is suspended for a long period of time or in a case where a part of the saving area is not updated for a long period of time, the host computer 100 may carry out reading-out and rewriting of data with respect to the entirety of the saving area for every constant period (for example, for every week). In addition, the host computer 100 may transmit a refresh command to the storage controller 310 for every constant period, and the storage controller 310 may carry out the reading-out and rewriting of data with respect to the entirety of the saving area in response to the refresh command.

Fifteenth Modification Example

In the above-described first embodiment, the dirty flag 211 is set to "1" whenever the writing in the main memory 200 is carried out from the host computer 100 (step S922), but the setting to "1" may be carried out at a different timing. In the fifteenth modification example, an address at which writing is to be carried out in the future is predicted, and then the dirty flag 211 that corresponds to the address is set to "1". That is, a virtual address that can be allocated for each application is managed, and then when a change occurs at the allocation, the dirty flag 211 and the preliminary process flag 212, which correspond to the address, is set to "1". In addition, whether or not data updating has been carried out after an immediately previous restoration process is managed for each application, and with respect to all addresses that are used by the application for which the data updating has been carried out, corresponding dirty flag 211 and preliminary process flag 212 are set to "1".

Figure 26:
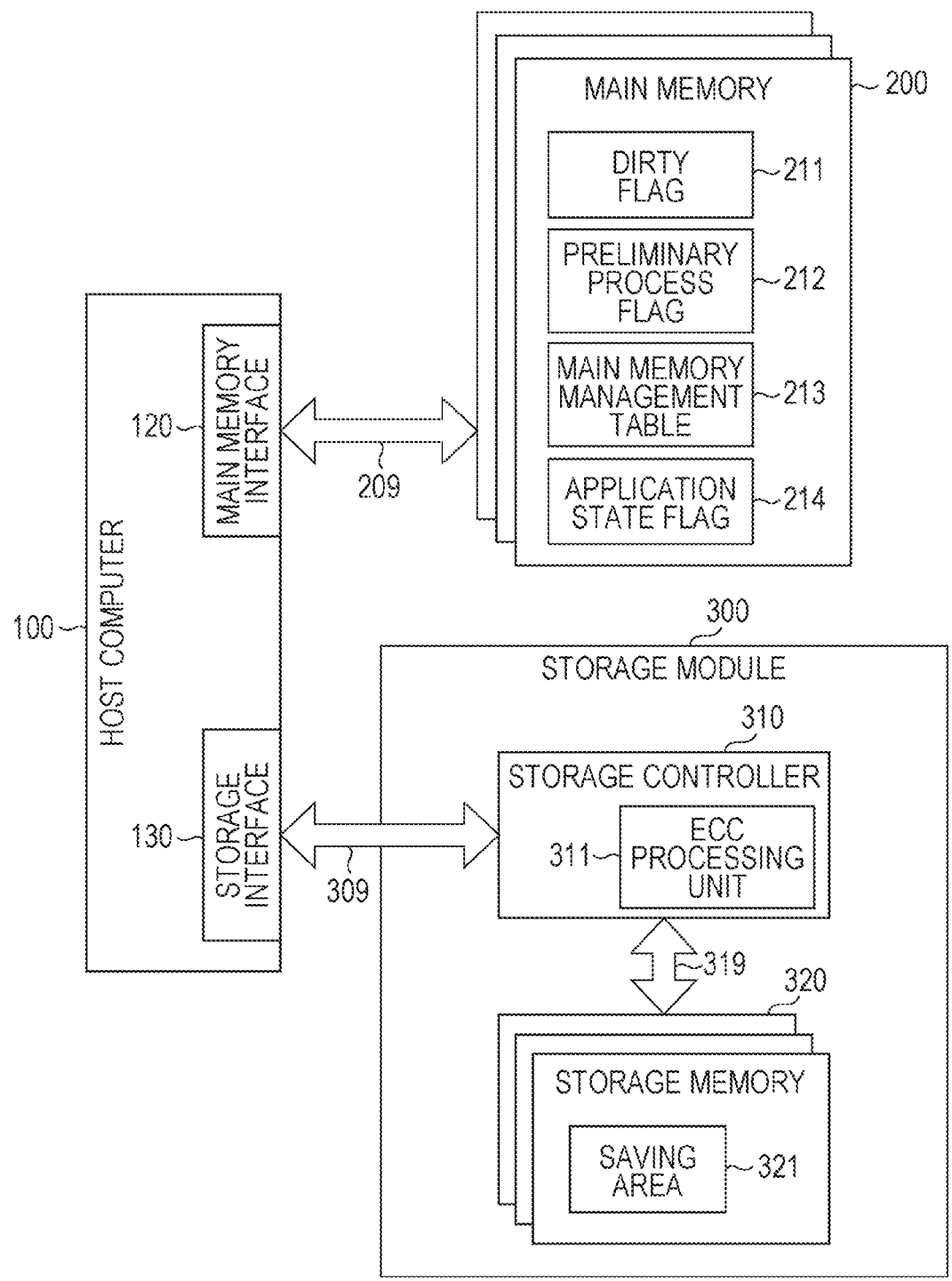
FIG. 26 is a diagram illustrating a configuration example of an information processing system according to a fifteenth modification example of the present disclosure.

FIG. 26 shows a diagram illustrating a configuration example of an information processing system according to the fifteenth modification example of the present disclosure.

The fifteenth modification example is different from the first embodiment in that a main memory management table 213 and an application state flag 214 are provided in the main memory 200, but the other configurations are the same as the first embodiment.

When a plurality of applications operate on the host computer 100, the main memory management table 213 is a table indicating in which manner a virtual address recognized by each of the applications corresponds to each physical address of the main memory.

The application state flag 214 is a flag indicating a list of applications during operation, and whether or not data updating has been carried out after an immediately previous restoration process with respect to each of the applications. For example, in a case where the flag is "0", this case indicates that updating has not been carried out after the immediately previous restoration process, and in a case where the flag is "1", this case indicates that updating has been carried out after the immediately previous restoration process.

FIG. 27 shows a diagram illustrating a configuration example of the main memory management table 213 according to the fifteenth modification example of the present disclosure. The main memory management table 213 manages an application of an allocation destination and a virtual address thereof in correspondence with each address of the main memory 200. With respect to an address that is not allocated to any application, indication of "empty" is shown.

When a new application is activated, or when a memory area that is to be occupied by an application during activation is added, the host computer 100 allocates an empty area of the main memory 200 with the number necessary for the application. At this time, a pair of new allocation destination (application) and virtual address is written in a corresponding address item of the main memory management table 213. In addition, when the application is completed, or when a part of the memory area occupied by the application during activation is opened, a corresponding address item of the main memory management table 213 is rewritten to "empty".

Figure 28:
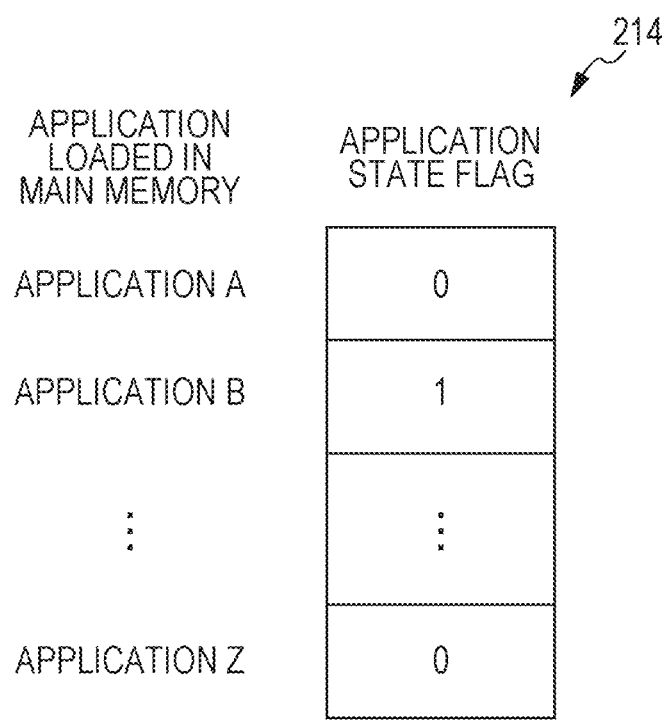
FIG. 28 is a diagram illustrating a configuration example of an application state flag according to the fifteenth modification example of the present disclosure.

FIG. 28 shows a diagram illustrating a configuration example of an application state flag 214 according to the fifteenth modification example of the present disclosure. The application state flag 214 retains whether or not data updating has been carried out after an immediately previous restoration process in correspondence with each application loaded in the main memory 200.

The application state flag 214 is checked for regular constant time intervals or before carrying out the saving process. As a result thereof, in a case where data updating is carried out after an immediately previous restoration process, with respect to all addresses that are used by the application, corresponding dirty flag 211 and preliminary process flag 212 are set to "1".

Figure 29:
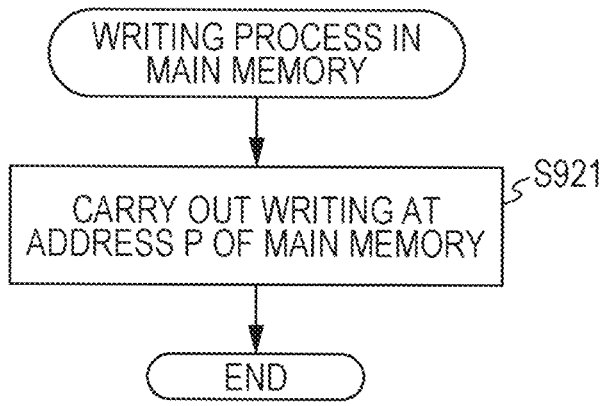
FIG. 29 is a flowchart illustrating a procedure example of a writing process in a main memory according to the fifteenth modification example of the present disclosure.

FIG. 29 shows a flowchart illustrating a procedure example of the writing process in the main memory 200 according to the fifteenth modification example of the present disclosure. In the fifteenth modification example, unlike the first embodiment, when carrying out the writing in the main memory (step S921), it is not necessary to carry out the operation of the dirty flag 211. Instead of the operation, as described below, operation of the dirty flag 211 is carried out when allocation of the main memory 200 is changed.

Figure 30:
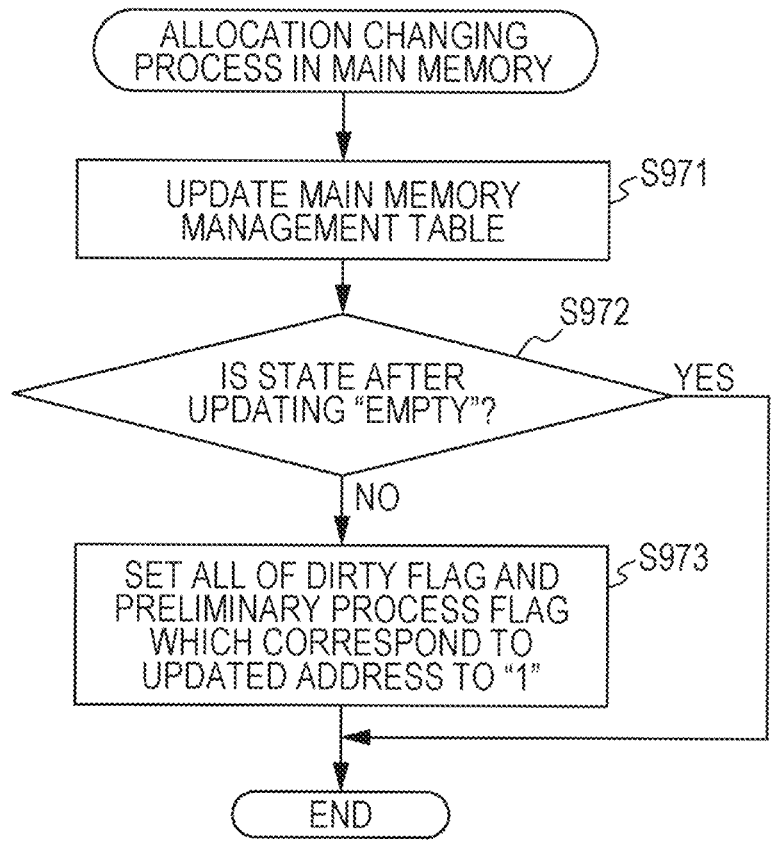
FIG. 30 is a flowchart illustrating a procedure example of an allocation changing process in the main memory according to the fifteenth modification example of the present disclosure.

FIG. 30 shows a flowchart illustrating a procedure example of an allocation changing process in the main memory 200 according to the fifteenth modification example of the present disclosure. As described above, when a new application is activated, or when a memory area that is to be occupied by an application during activation is added, the host computer 100 changes a corresponding address item of the main memory management table 213. In addition, even when the application is completed, or even when a part of the memory area occupied by the application during activation is opened, a corresponding address item of the main memory management table 213 is changed. Updating of the main memory management table 213 occurs (step S971), all of the dirty flag 211 and the preliminary process flag 212 which correspond to the updated address are set to "1" (step S973). However, in a case where a state after the updating is "empty" (Yes in step S972), the saving process in not necessary, and thus the change of the dirty flag 211 and the preliminary process flag 212 is not carried out.

Figure 31:
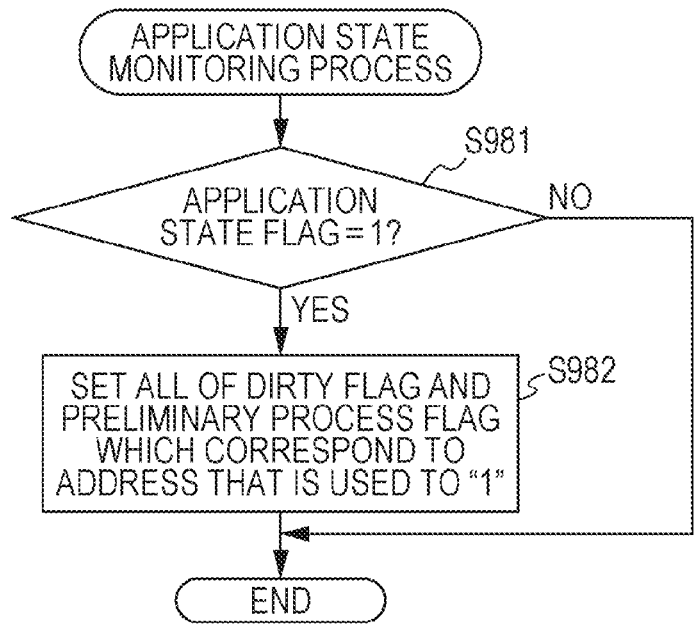
FIG. 31 is a flowchart illustrating a procedure example of a monitoring process of the application state flag according to the fifteenth modification example of the present disclosure.

FIG. 31 shows a flowchart illustrating a procedure example of a monitoring process of the application state flag 214 according to the fifteenth modification example of the present disclosure. In the fifteenth modification example, the application state flag 214 is checked for regular constant time intervals. In addition, the application state flag 214 is also checked even before carrying out the saving process. That is, whether or not the application state flag 214 indicates that data updating is carried out after an immediately previous restoration process (here, "1") is checked (step S981). In addition, in a case where the application state flag 214 indicates "1" (Yes in step S981), all of dirty flags 211 and preliminary process flags 212 which correspond to all addresses of the main memory 200 which are used by the application are set to "1" (step S973)

Sixteenth Modification Example

In the above-described embodiments, the dirty flag 211 is used, but the restoration process and the saving process can be carried out without using the dirty flag 211.

Figure 32:
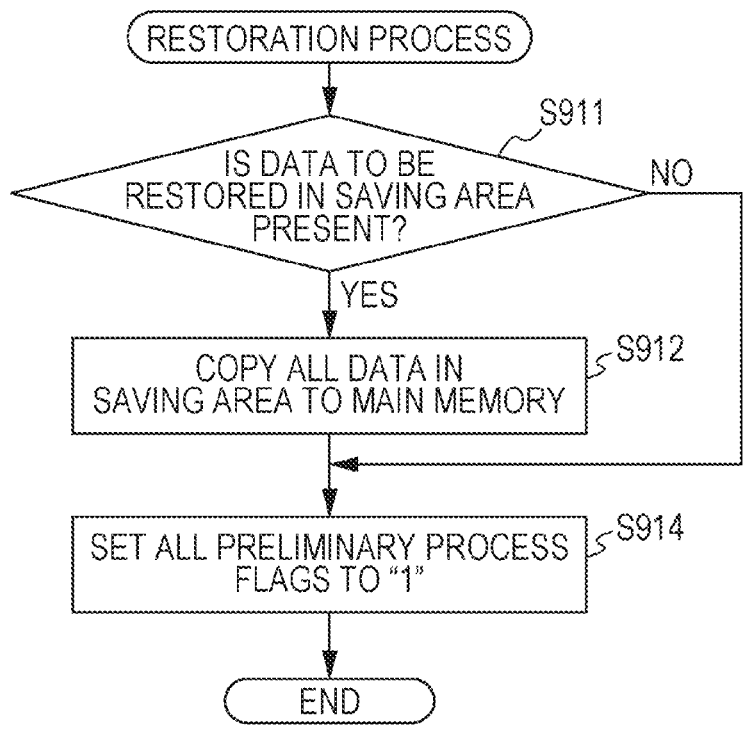
FIG. 32 is a flowchart illustrating a procedure example of a restoration process according to a sixteenth modification example of the present disclosure.

FIG. 32 shows a flowchart illustrating a procedure example of a restoration process according to a sixteenth modification example of the present disclosure. In the same case as the first embodiment, the host computer 100 initiates the restoration process. At this time, in a case where data to be restored is present in the saving area 321 of the storage memory 320 (Yes in step S911), all data in the saving area 321 is copied to the main memory 200 (step S912). In addition, when the restoration process is terminated, all preliminary process flags 212 are set to "1" (step S914).

Figure 33:
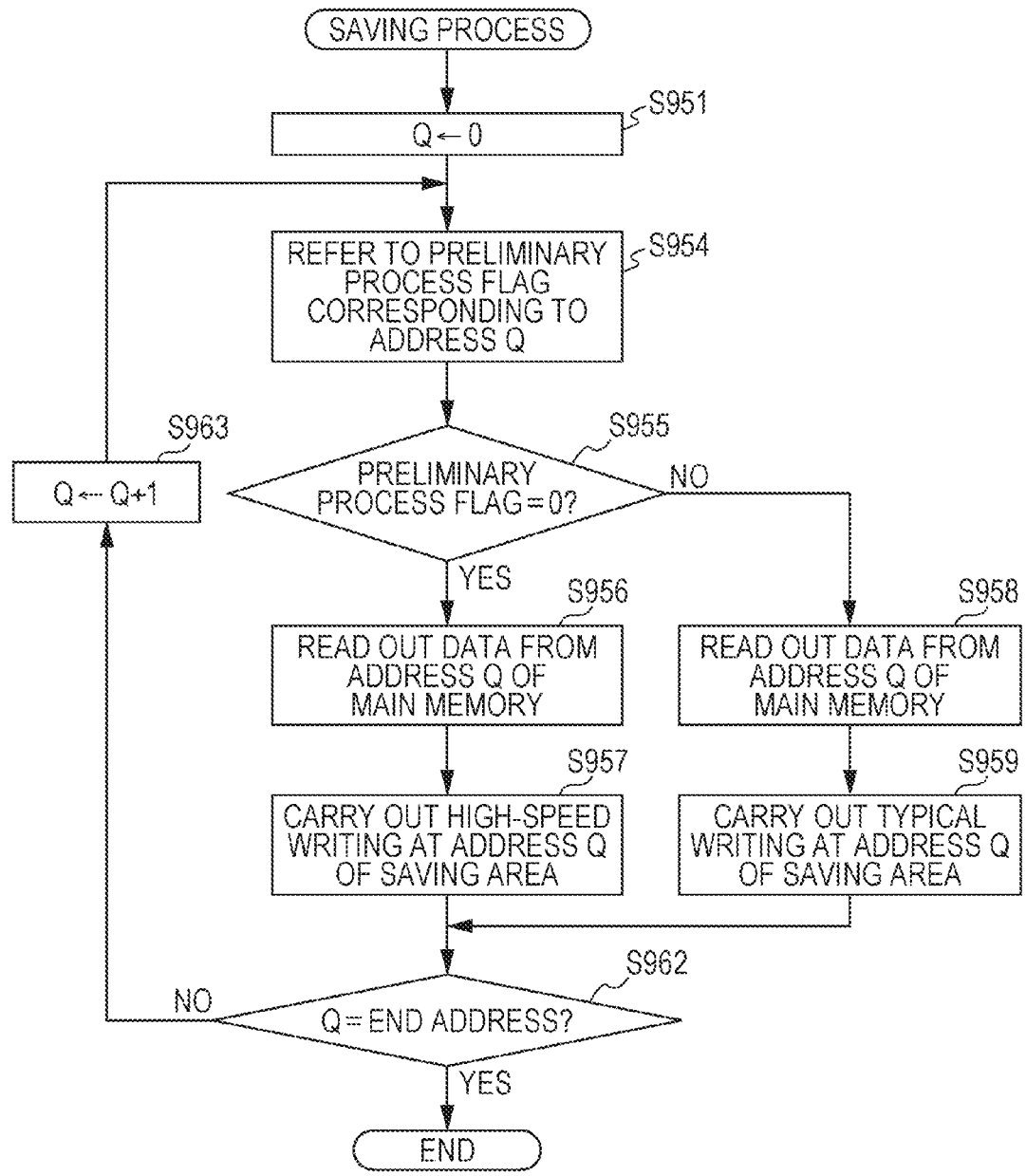
FIG. 33 is a flowchart illustrating a procedure example of a saving process in a storage memory according to the sixteenth modification example of the present disclosure.

FIG. 33 shows a flowchart illustrating a procedure example of a saving process in the storage memory 320 according to the sixteenth modification example of the present disclosure. FIG. 33 shows a configuration in which the process relating to the dirty flag 211 is excluded from FIG. 11 in the above-described first embodiment. Accordingly, detailed description thereof will not be repeated.

In the sixteenth modification example, the preliminary process can be initiated at an arbitrary timing after carrying out the restoration process. The preliminary process is the same as FIG. 10 in the above-described first embodiment, and thus detailed description thereof will not be repeated.

Seventeenth Modification Example

In the above-described embodiments, a storage element showing binary values is assumed as the storage memory 320, but the storage memory 320 may be applied to a multi-value storage element.

Figure 34:
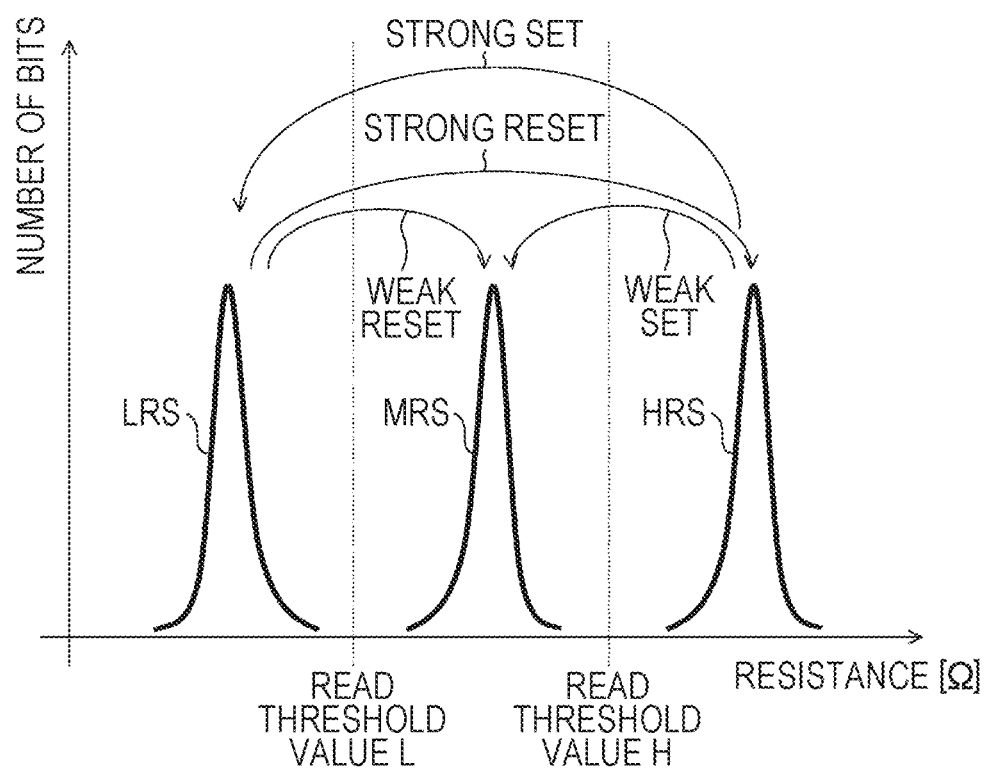
FIG. 34 is a diagram illustrating a resistance state of a resistance-variable memory according to the sixteenth modification example of the present disclosure.

FIG. 34 shows a diagram illustrating a resistance state of a resistance-variable memory according to the sixteenth modification example of the present disclosure. A memory cell of the resistance-variable memory according to the sixteenth modification example is assumed to show any one of a total of three states including a low resistance state (LRS), a high resistance state (HRS), and a middle resistance state (MRS).

In the sixteenth modification example, in the case of the LRS, the LRS transitions to the MRS by a weak reset operation, and transitions to the HRS by a strong reset operation. In the case of the HRS, the HRS transitions to the MRS by a weak set operation, and transitions to the LRS by a strong set operation. That is, even in the same reset process, when writing is carried out by changing intensity (any one of a pulse width, the number of pulses, a pulse voltage, and a pulse current), an intermediate resistance value can be created.

In the sixteenth modification example, similar to the binary values, writing during the preliminary process is carried out in such a manner that all bits of addresses to be processed become the LRS (or HRS).

In a case where the preliminary process is not carried out, it is necessary to carry out four kinds of writing operations including the weak reset, the weak set, the strong reset, and the strong set, but in a case where all bits become the LRS by the preliminary process, it is possible to carry out the writing by carrying out two operations among the four kinds of writing operations.

Eighteenth Modification Example

In the above-described first embodiment, the dirty flag 211 is updated whenever an access to the main memory 200 from the host computer 100 is carried out (step S922), but the updating may be carried out by an external device regardless of presence or absence of the access. In addition, updating of the preliminary process flag 212 may also be carried out by an external device.

In addition, the above-described embodiments show an example to embody the present disclosure, and specifications in the embodiments and specific inventive specifications in claims have a corresponding relationship, respectively. Similarly, specific inventive specifications in claims and specifications in the embodiments of the present disclosure to which the same component names are given have a corresponding relationship, respectively. However, the present disclosure is not limited to the embodiments, and the present disclosure can be embodied by making various modifications with respect to the embodiments in a range not departing from the scope of the present disclosure.

In addition, the procedure described in the above-described embodiments may be understood as a method including a series of processes, or may be understood as a program that allows the series of processes to be executed by a computer, or a recording medium that stores the program. As the recording medium, for example, a compact disc (CD), a minidisc (MD), a digital versatile disc (DVD), a memory card, a Blu-ray (registered trademark) disc, and the like may be used.

In addition, the present disclosure may employ the following configurations.

(1) A storage control device, comprising: a detection unit configured to determine whether a preliminary process of saving data from a first memory to a second memory is necessary, wherein the second memory includes a suspend area and a typical area; a preliminary processing unit configured to write a first value to the suspend area when the detection unit has determined that the preliminary process is necessary; and a saving processing unit configured to write a second value corresponding to the data, wherein the first value is different from the second value when the detection unit has determined that the preliminary process is necessary.

(2) The storage control device according to (1), wherein the detection unit is configured to determine that the preliminary process is necessary whenever data is written to a predetermined area of the first memory.

(3) The storage control device according to (1) or (2), further comprising: a preliminary process flag having a value indicating whether or not the preliminary process has been carried out after data has been written to a predetermined area of the first memory, wherein the detection unit is configured to determine that the preliminary process is necessary whenever the preliminary process flag indicates that the preliminary process has not been carried out.

(4) The storage control device according to (3), wherein, when the preliminary process flag has a value indicating that the preliminary process has not been carried out, the saving processing unit is configured to write the first value to the suspend area and then write the second value corresponding to the data.

(5) The storage control device according to any one of (1) to (4), further comprising: a restoration processing unit configured to restore data from the second memory to the first memory in response to a request for a restoration process.

(6) The storage control device according to any one of (1) to (5), further comprising: a dirty flag having a value indicating whether or not data has been written to a predetermined area of the first memory, wherein the saving processing unit is configured to write the second value corresponding to the data when the dirty flag has a value indicating that data has been written.

(7) The storage control device according to any one of (1) to (6), wherein the preliminary processing unit is configured to write the first value to the suspend area using a first control signal, wherein a portion of the first control signal corresponding to the suspend area has a smaller number of pulses than a portion of the first control signal corresponding to the typical area, and wherein the saving processing unit is configured to write the second value to the suspend area using a second control signal, wherein a portion of the second control signal corresponding to the suspend area has a smaller number of pulses than a portion of the second control signal corresponding to the typical area.

(8) The storage control device according to any one of (1) to (7), wherein the preliminary processing unit is configured to write the first value to the suspend area using a first control signal, wherein a portion of the first control signal corresponding to the suspend area has a narrower pulse width than a portion of the first control signal corresponding to the typical area, and wherein the saving processing unit is configured to write the second value to the suspend area using a second control signal, wherein a portion of the second control signal corresponding to the suspend area has a narrower pulse width than a portion of the second control signal corresponding to the typical area.

(9) The storage control device according to any one of (1) to (8), wherein the preliminary processing unit is configured to write the first value to the suspend area using a first control signal, wherein a portion of the first control signal corresponding to the suspend area has a lower voltage than a portion of the first control signal corresponding to the typical area, and wherein the saving processing unit is configured to write the second value to the suspend area using a second control signal, wherein a portion of the second control signal corresponding to the suspend area has a lower voltage than a portion of the second control signal corresponding to the typical area.

(10) The storage control device according to any one of (1) to (9), wherein the preliminary processing unit is configured to write the first value to the suspend area using a first control signal, wherein a portion of the first control signal corresponding to the suspend area has a smaller current than a portion of the first control signal corresponding to the typical area, and wherein the saving processing unit is configured to write the second value to the suspend area using a second control signal, wherein a portion of the second control signal corresponding to the suspend area has a smaller current than a portion of the second control signal corresponding to the typical area.

(11) The storage control device according to any one of (1) to (10), wherein the first value and the second value are selected from binary values.

(12) The storage control device according to any one of (1) to (11), wherein the first value and the second value are selected from more than binary values.

(13) A storage device, comprising: a first memory configured to store data; a second memory configured to save the data stored in the first memory and including a suspend area and a typical area; a detection unit configured to determine whether a preliminary process of saving data from the first memory to the second memory is necessary; a preliminary processing unit configured to write a first value to the suspend area when the detection unit has determined that the preliminary process is necessary; and a saving processing unit configured to write a second value corresponding to the data, wherein the first value is different from the second value when the detection unit has determined that the preliminary process is necessary.

(14) A storage control method, comprising: determining, by a detection unit, whether a preliminary process of saving data from a first memory to a second memory is necessary, wherein the second memory includes a suspend area and a typical area; writing, by a preliminary processing unit, a first value to the suspend area for data for which the detection unit has determined that the preliminary process is necessary; and writing, by a saving processing unit, a second value corresponding to the data, wherein the first value is different from the second value when the detection unit has determined that the preliminary process is necessary.

It should be understood by those skilled in the art that various modifications, combinations, sub-combinations and alterations may occur depending on design requirements and other factors insofar as they are within the scope of the appended claims or the equivalents thereof.

What is claimed is:

1. A storage control device, comprising:
a detecting unit configured to determine whether a preliminary process of saving data from a first memory to a second memory is necessary, wherein the second memory includes a suspend area and a typical area, and wherein the preliminary process of saving the data includes a pre-read process and one of a reset process or a set process;
a preliminary processing unit is configured to
perform the pre-read process on the suspend area by reading out one or more current values of the suspend area and comparing the one or more current values to the data in response to the detecting unit determining that the preliminary process of saving the data from the first memory to the second memory is necessary, and perform the one of the reset process or the set process by changing the one or more current values of the suspend area to a first value based on the pre-read process; and a saving processing unit is configured to write a second value that corresponds with the data to the suspend area in response to the preliminary processor performing the one of the reset process or the set process, wherein the second value is different from the first value.

2. The storage control device according to claim 1, wherein the detecting unit is configured to determine that the preliminary process is necessary whenever the data is written to a predetermined area of the first memory.

3. The storage control device according to claim 1, further comprising:

a preliminary process flag having a value indicating whether the preliminary process has been carried out after the data has been written to a predetermined area of the first memory, and wherein the detecting unit is configured to determine that the preliminary process is necessary whenever the preliminary process flag indicates that the preliminary process has not been carried out.

4. The storage control device according to claim 3, wherein, when the value of the preliminary process flag indicates that the preliminary process has not been carried out, the saving processing unit is configured to write the first value to the suspend area and then write the second value corresponding to the data to the suspend area.

5. The storage control device according to claim 1, further comprising:

a restoration processing unit configured to restore the data from the second memory to the first memory in response to a request for a restoration process.

6. The storage control device according to claim 1, further comprising:

a dirty flag having a value indicating whether the data has been written to a predetermined area of the first memory, wherein the saving processing unit is configured to write the second value corresponding to the data when the value of the dirty flag indicates that the data has been written to the predetermined area of the first memory.

7. The storage control device according to claim 1, wherein the preliminary processing unit is configured to write the first value to the suspend area using a first control signal, wherein a first portion of the first control signal that corresponds to the suspend area has a smaller number of pulses than a second portion of the first control signal that corresponds to the typical area, and wherein the saving processing unit is configured to write the second value to the suspend area using a second control signal, wherein a first portion of the second control signal corresponding to the suspend area has a smaller number of pulses than a second portion of the second control signal corresponding to the typical area.

8. The storage control device according to claim 1, wherein the preliminary processing unit is configured to write the first value to the suspend area using a first control signal, wherein a first portion of the first control signal that corresponds to the suspend area has a narrower pulse width than a second portion of the first control signal that corresponds to the typical area, and wherein the saving processing unit is configured to write the second value to the suspend area using a second control signal, wherein a first portion of the second control signal that corresponds to the suspend area has a narrower pulse width than a second portion of the second control signal that corresponds to the typical area.

9. The storage control device according to claim 1, wherein the preliminary processing unit is configured to write the first value to the suspend area using a first control signal, wherein a first portion of the first control signal that corresponds to the suspend area has a lower voltage than a second portion of the first control signal that corresponds to the typical area, and wherein the saving processing unit is configured to write the second value to the suspend area using a second control signal, wherein a first portion of the second control signal that corresponds to the suspend area has a lower voltage than a second portion of the second control signal that corresponds to the typical area.

10. The storage control device according to claim 1, wherein the preliminary processing unit is configured to write the first value to the suspend area using a first control signal, wherein a first portion of the first control signal that corresponds to the suspend area has a smaller current than a second portion of the first control signal that corresponds to the typical area, and wherein the saving processing unit is configured to write the second value to the suspend area using a second control signal, wherein a first portion of the second control signal that corresponds to the suspend area has a smaller current than a second portion of the second control signal that corresponds to the typical area.

11. The storage control device according to claim 1, wherein the first value and the second value are selected from binary values.

12. The storage control device according to claim 1, wherein the first value and the second value are selected from more than binary values.

13. A storage device, comprising:

a first memory configured to store data;

a second memory including a suspend area and a typical area, the second memory being configured to save the data stored in the first memory;

a detecting unit configured to determine whether a preliminary process of saving data from the first memory to the second memory is necessary, wherein the preliminary process of saving the data includes a pre-read process and one of a reset process or a set process;

a preliminary processing unit is configured to perform the pre-read process on the suspend area by reading out one or more current values of the suspend area and comparing the one or more current values to the data in response to the detecting unit determining that the preliminary process of saving the data from the first memory to the second memory is necessary, and perform the one of the reset process or the set process by changing the one or more current values of the suspend area to a first value based on the pre-read process, and a saving processing unit is configured to write a second value that corresponds with the data to the suspend area in response to the preliminary processing unit performing the one of the reset process or the set process, wherein the second value is different from the first value.

14. A storage control method, comprising:
  determining, by a detecting unit, whether a preliminary process of saving data from a first memory to a second memory is necessary, wherein the second memory includes a suspend area and a typical area, and wherein the preliminary process of saving the data includes a pre-read process and one of a reset process or a set process;
  responsive to determining that the preliminary process of saving the data from the first memory to the second memory is necessary, performing, by a preliminary processing unit, the pre-read process by
    reading out one or more current values of the suspend area, and
    comparing the one or more current values to the data;
  performing, by the preliminary processing unit, the one of the reset process or the set process by changing the one or more current values of the suspend area to a first value based on the pre-read process; and
  responsive to performing the one of the reset process or the set process, writing, by a saving processing unit, a second value that corresponds with the data to the suspend area, wherein the second value is different from the first value.

15. The storage control device according to claim 1, wherein the preliminary processing unit is further configured to not perform the reset process or the set process in response to the detecting unit determining that the preliminary process of saving the data from the first memory to the second memory is not necessary.

16. The storage control device according to claim 1, wherein the saving processing unit is further configured to change values of the suspend area to the first value and write the second value corresponding to the data to the suspend area in response to the detecting unit determining that the preliminary process of saving the data from the first memory to the second memory is not necessary.

17. The storage device according to claim 13, wherein the preliminary processing unit is further configured to not perform the reset process or the set process in response to the detecting unit determining that the preliminary process of saving the data from the first memory to the second memory is not necessary.

18. The storage device according to claim 13, wherein the saving processing unit is further configured to change values of the suspend area to the first value and write the second value corresponding to the data to the suspend area in response to the detecting unit determining that the preliminary process of saving the data from the first memory to the second memory is not necessary.

19. The storage control method according to claim 14, wherein the preliminary processing unit is further configured to not perform the reset process or the set process in response to the detecting unit determining that the preliminary process of saving the data from the first memory to the second memory is not necessary.

20. The storage control method according to claim 14, wherein the saving processing unit is further configured to change values of the suspend area to the first value and write the second value corresponding to the data to the suspend area in response to the detecting unit determining that the preliminary process of saving the data from the first memory to the second memory is not necessary.

* * * * *